(12) United States Patent
Borenstein et al.

(10) Patent No.: US 9,443,488 B2
(45) Date of Patent: Sep. 13, 2016

(54) IMAGE TRANSFORMING VISION ENHANCEMENT DEVICE

(71) Applicant: Digital Vision Enhancement Inc, Shoreview, MN (US)

(72) Inventors: Nathaniel S. Borenstein, Wexford, PA (US); Thomas P. Neuendorffer, Wexford, PA (US)

(73) Assignee: DIGITAL VISION ENHANCEMENT INC, Shoreview, MN (US)

( * ) Notice: Subject to any disclaimer, the term of this patent is extended or adjusted under 35 U.S.C. 154(b) by 0 days.

(21) Appl. No.: 14/804,197

(22) Filed: Jul. 20, 2015

(65) Prior Publication Data

US 2016/0104453 A1    Apr. 14, 2016

Related U.S. Application Data

(60) Provisional application No. 62/122,130, filed on Oct. 14, 2014.

(51) Int. Cl.
*H04N 7/18* (2006.01)
*G09G 5/02* (2006.01)
(Continued)

(52) U.S. Cl.
CPC . *G09G 5/02* (2013.01); *G06T 5/20* (2013.01); *G06T 11/001* (2013.01); *H04N 5/2253* (2013.01); *H04N 9/04* (2013.01); *H04N 13/0422* (2013.01); *G06T 2207/10024* (2013.01); *G09G 2340/06* (2013.01)

(58) Field of Classification Search
CPC ......... G09G 5/02; G06T 11/001; G06T 5/20; G06T 2207/10024; H04N 5/2253; H04N 9/04; H04N 13/0422
See application file for complete search history.

(56) References Cited

U.S. PATENT DOCUMENTS 3,586,423 A    6/1971    Zeltzer
3,701,590 A    10/1972    Zeltzer
(Continued)

FOREIGN PATENT DOCUMENTS

WO    2014113891 A1    7/2014

OTHER PUBLICATIONS

Machado, et al., "A Physiologically-based Model for Simulation of Color Vision Deficiency", 8 pages (2009).
(Continued)

*Primary Examiner* — Mohammed Rahaman
(74) *Attorney, Agent, or Firm* — ARC IP Law, PC; Joseph J. Mayo

(57) ABSTRACT

Image transforming vision enhancement device that enhances vision by transforming images provided by one or more cameras into modified images projected on one or more displays. The system may be embedded in glasses, contact lenses, binoculars, or other vision devices, in computer screens, or in components of moving vehicles. Image transformations may include modifying colors to assist colorblind users or to highlight color ranges, mapping invisible frequencies into visible colors, adding labels or graphics, and generating time-varying images with flashing or changing features. Images from multiple cameras may be combined, providing users with panoramic vision from a single device. Low light vision may be enhanced, and excessive glare may be attenuated. The system may magnify images with a variable magnification. User interfaces may be provided to configure and customize the image transformations.

48 Claims, 21 Drawing Sheets

(51) Int. Cl.
  *G06T 11/00*  (2006.01)
  *G06T 5/20*  (2006.01)
  *H04N 5/225*  (2006.01)
  *H04N 9/04*  (2006.01)
  *H04N 13/04*  (2006.01)

(56) References Cited

U.S. PATENT DOCUMENTS

| | | |
|---|---|---|
| 4,300,819 A | 11/1981 | Taylor |
| 5,917,573 A * | 6/1999 | Davis .................... G02C 5/001 351/158 |
| 7,705,855 B2 | 4/2010 | Elliott |
| 2010/0073469 A1 | 3/2010 | Fateh |
| 2011/0090453 A1 | 4/2011 | Chen et al. |
| 2011/0141104 A1 | 6/2011 | Tin |
| 2011/0216179 A1 | 9/2011 | Dialameh et al. |
| 2011/0229023 A1 | 9/2011 | Jones et al. |
| 2013/0021438 A1 | 1/2013 | Tucker |
| 2013/0208234 A1 | 8/2013 | Lewis |
| 2013/0219357 A1 | 8/2013 | Reitan |
| 2013/0335435 A1 * | 12/2013 | Ambrus .................. G06T 19/20 345/589 |
| 2014/0152778 A1 | 6/2014 | Ihlenburg et al. |
| 2014/0226900 A1 | 8/2014 | Saban et al. |
| 2015/0192776 A1 | 7/2015 | Lee et al. |
| 2016/0037077 A1 | 2/2016 | Hansen et al. |

OTHER PUBLICATIONS

Zeltzer, "The X-Chrom Manual", Second Edition, 23 pages (1975).
International Search Report and Written Opinion issued on Feb. 2, 2016 in PCT/US15/51883, 13 pages.

* cited by examiner

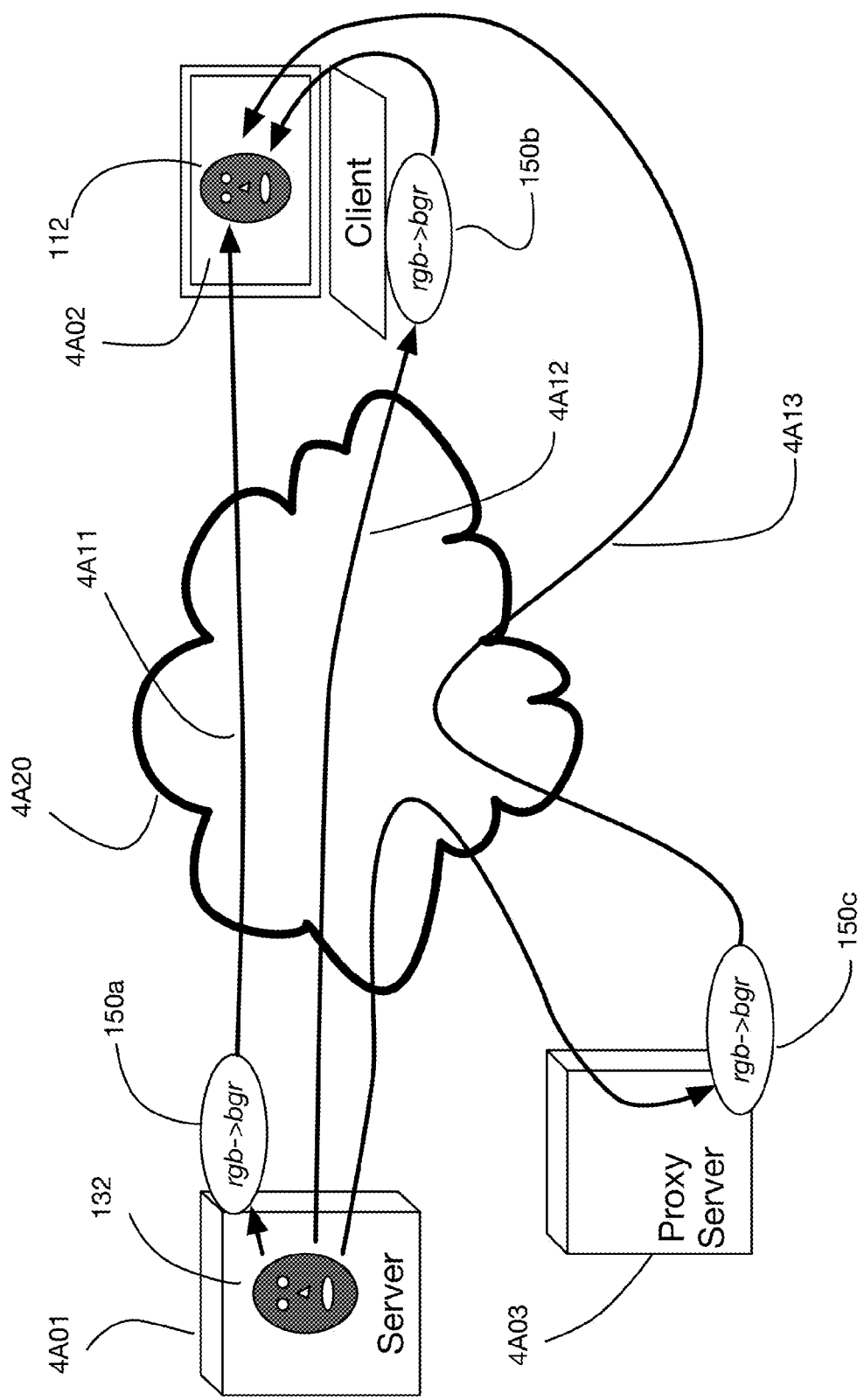

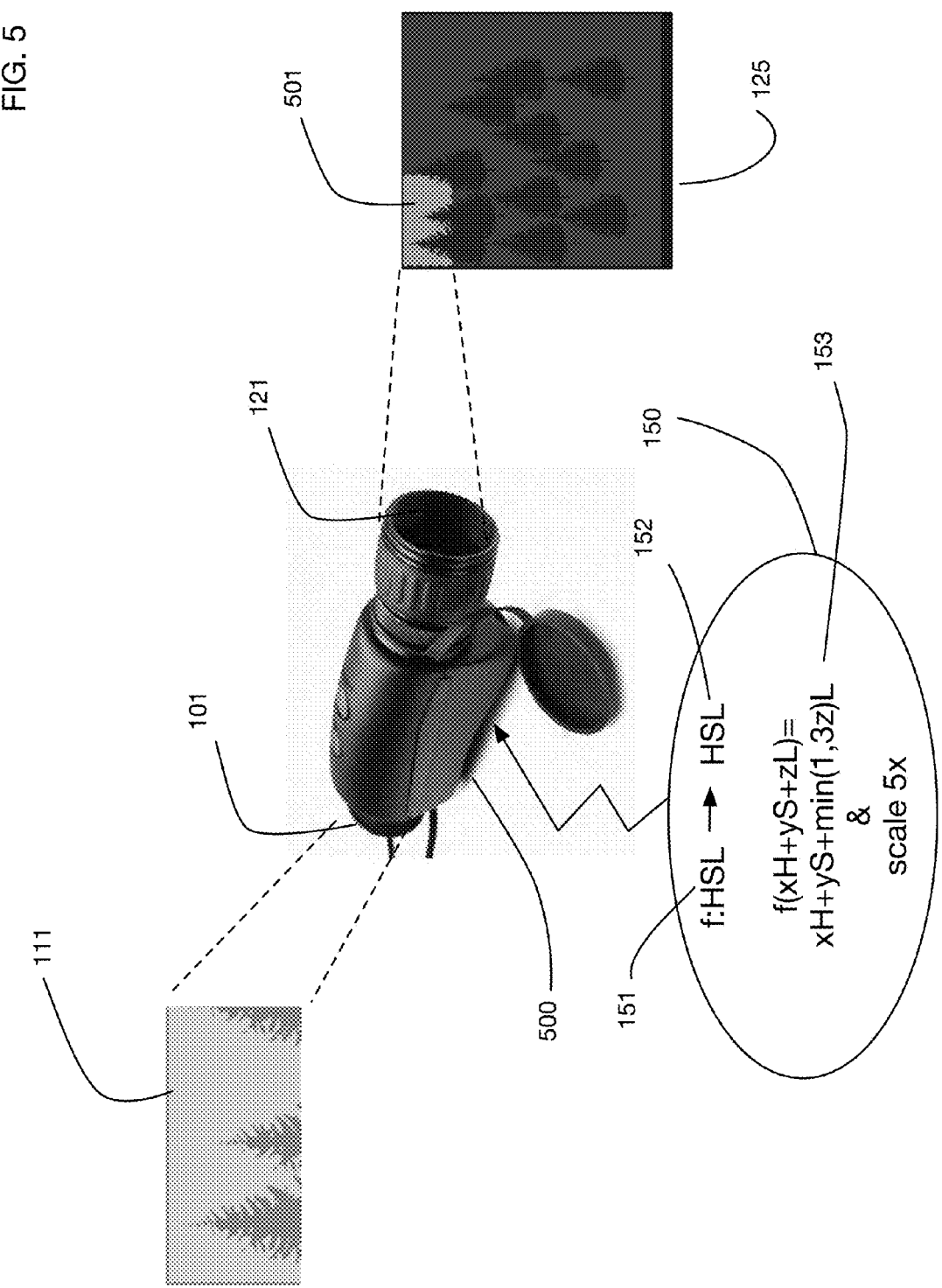

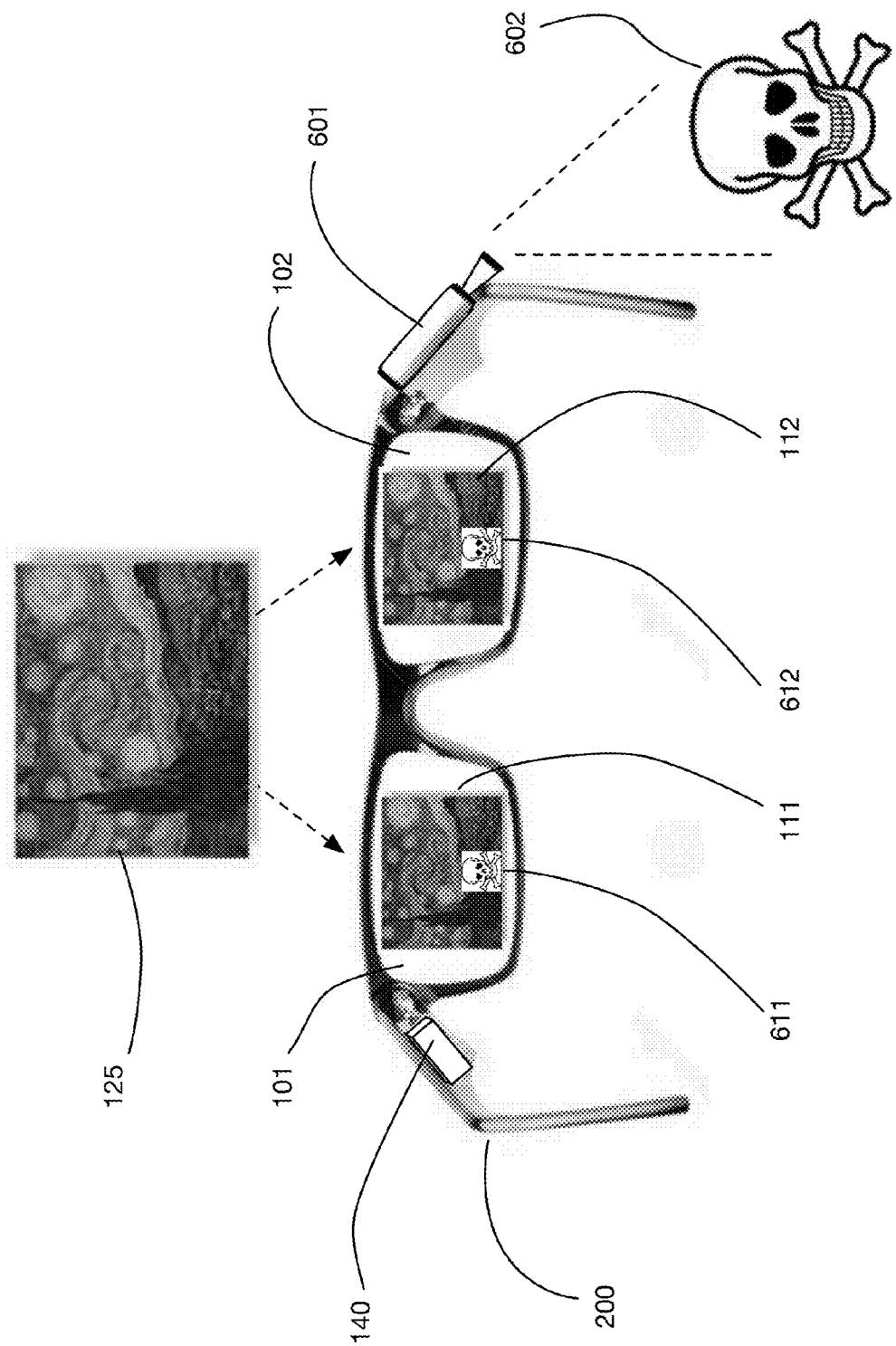

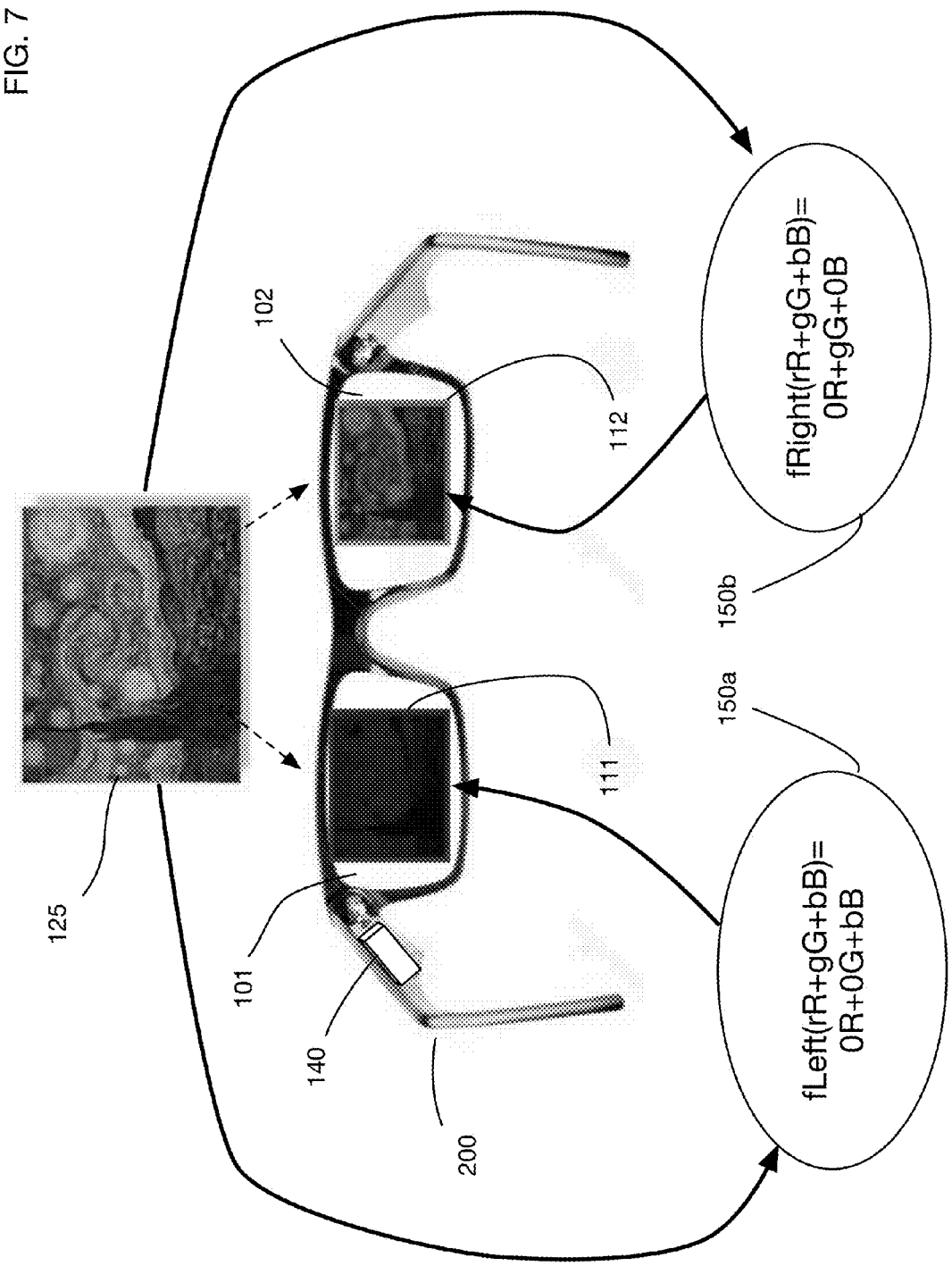

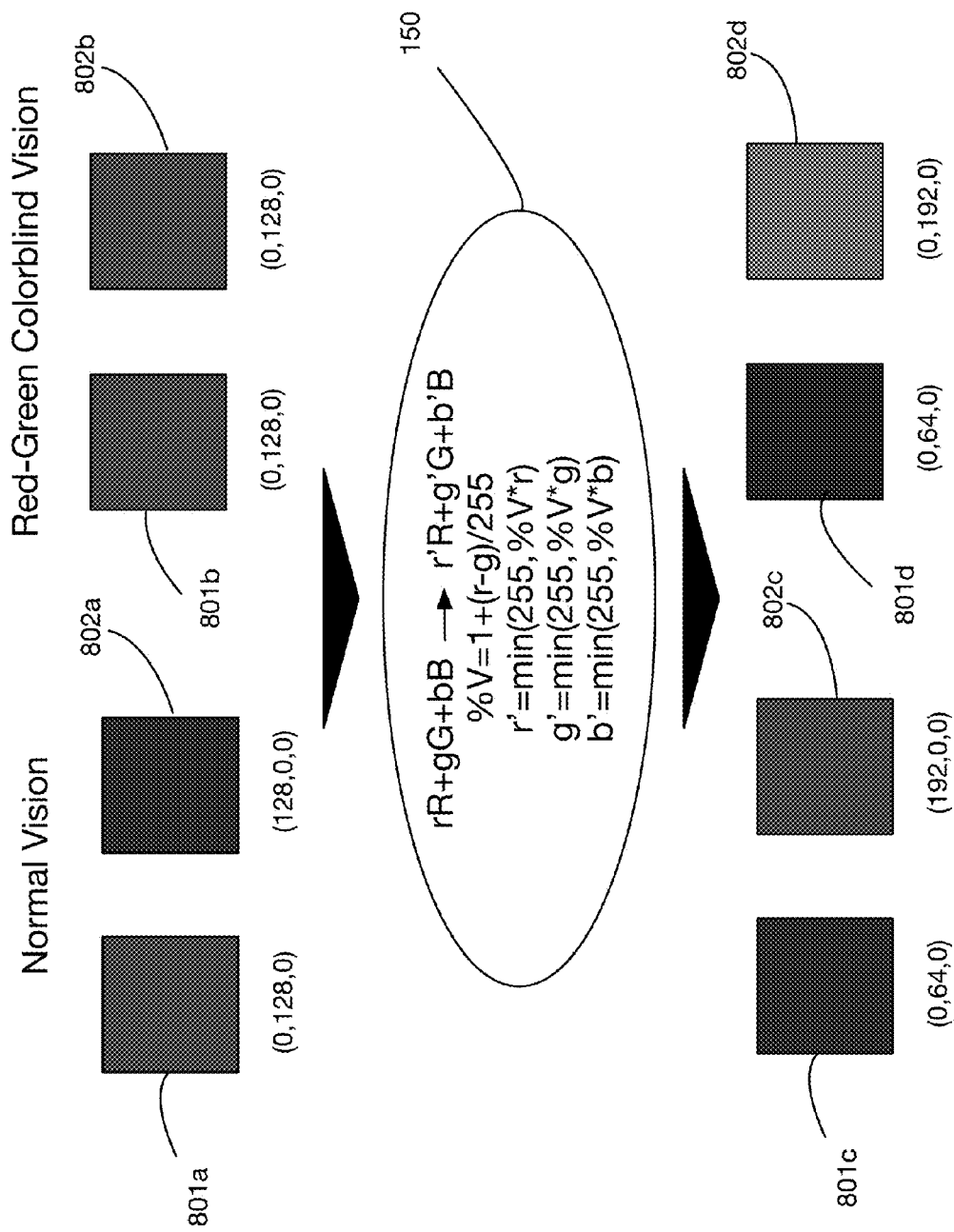

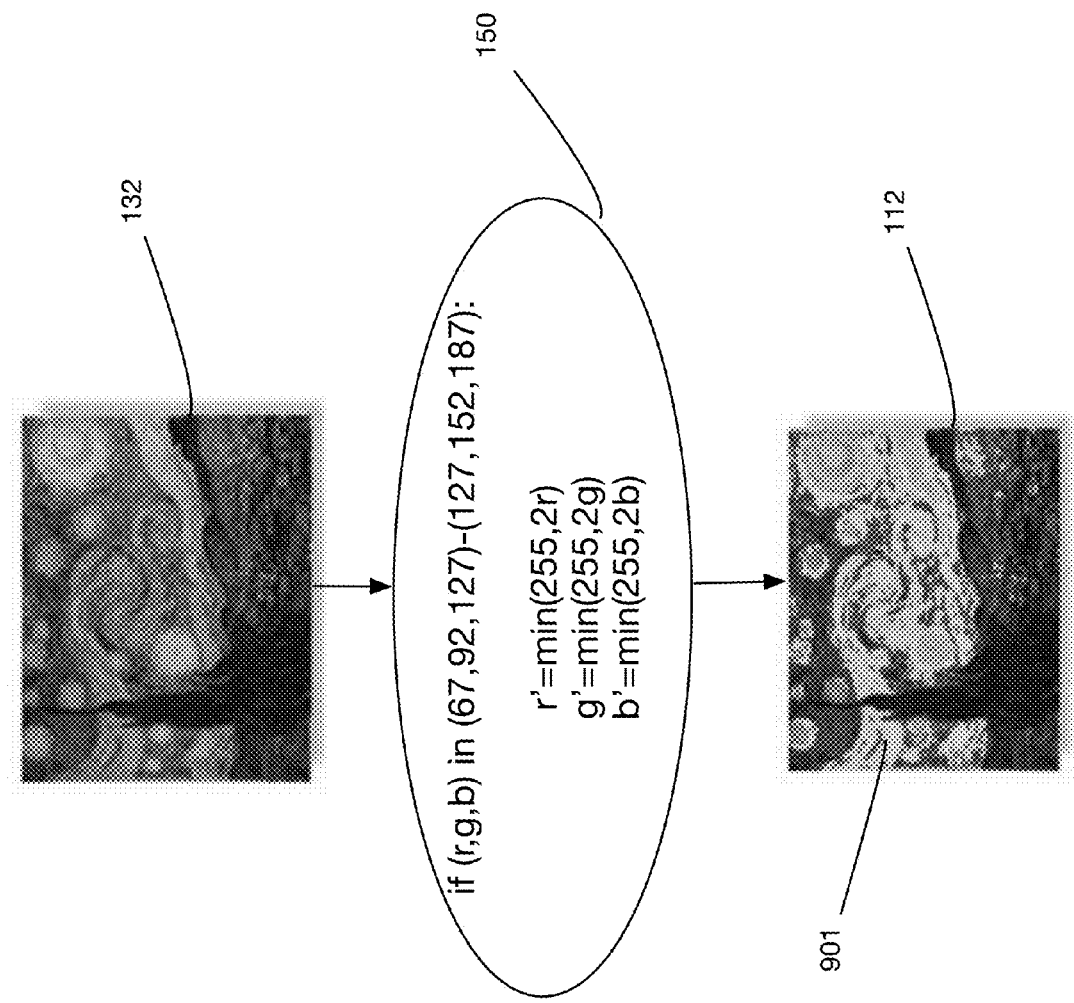

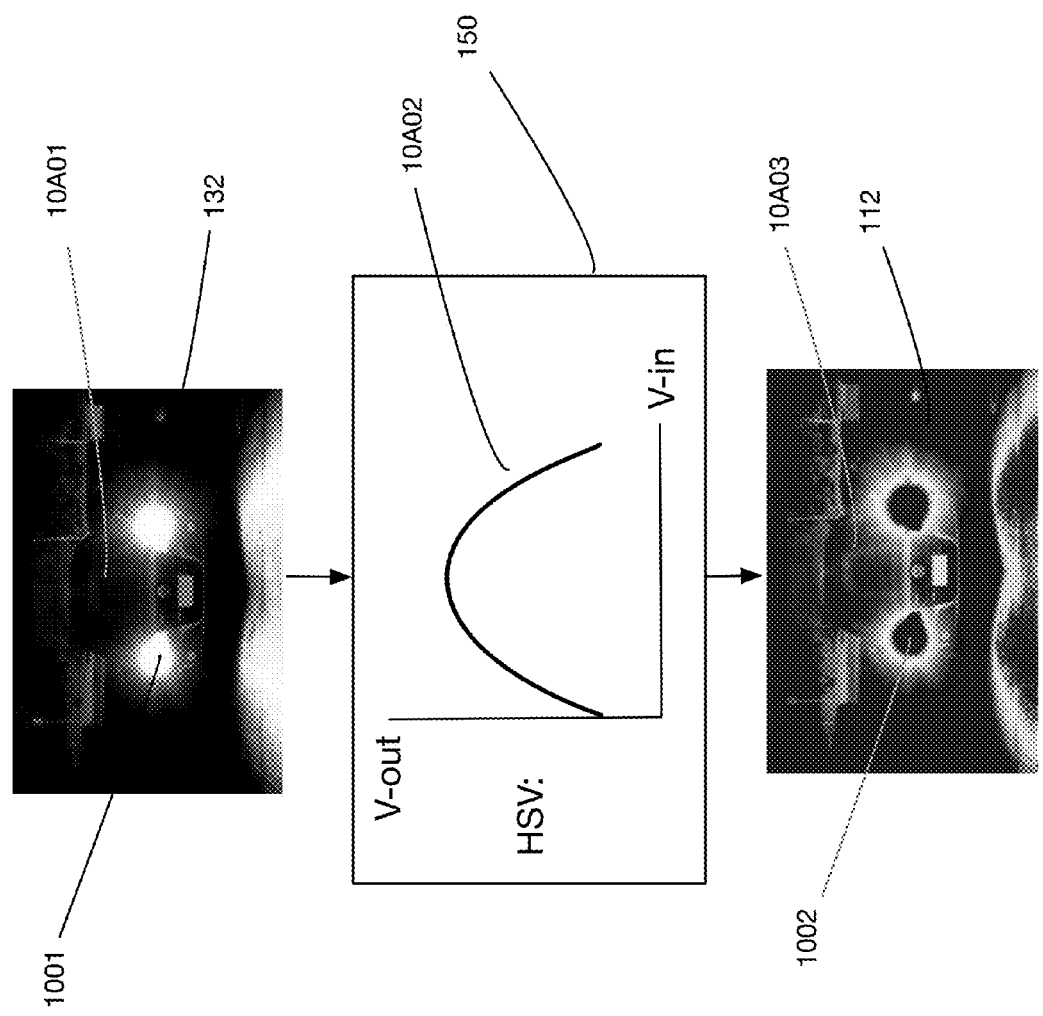

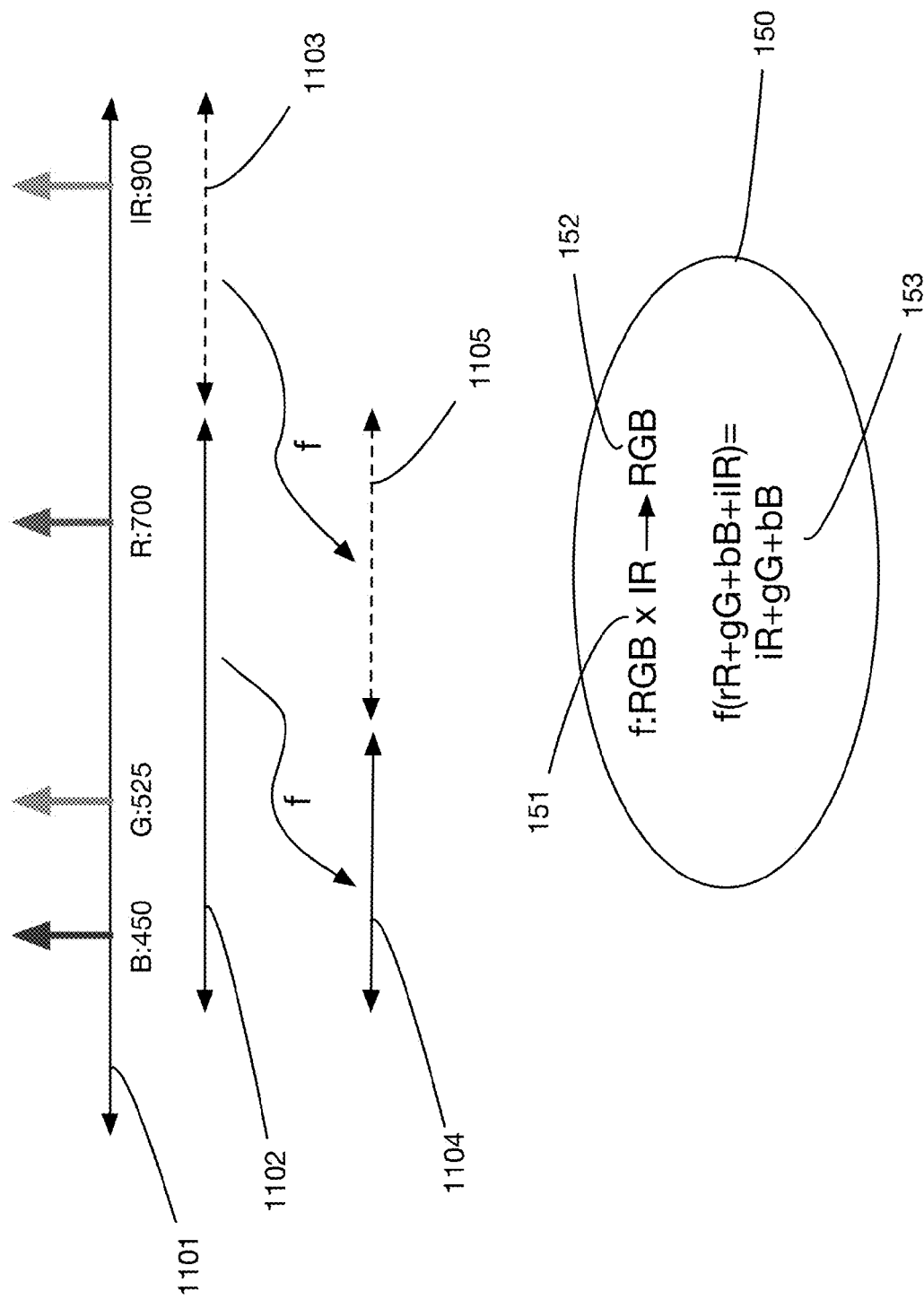

IMAGE TRANSFORMING VISION ENHANCEMENT DEVICE

This utility patent application claims the benefit of U.S. Provisional Patent Application No. 62/122,130, filed 14 Oct. 2014, the specification of which is hereby incorporated herein by reference.

BACKGROUND OF THE INVENTION

1. Field of the Invention

This invention relates generally to the field of correction, augmentation, and enhancement of vision. In particular, but not by way of limitation, one or more embodiments of the invention relate to an image transforming vision enhancement device, for example that may be utilized to transform images using color transformations and mapping, magnification, cropping, rotation, scaling, selection, and overlay of graphics or labels and generating time-varying images with flashing or changing features to indicate colors for example, or any combination thereof.

2. Description of the Related Art

Vision enhancement devices such as specialized eyeglasses or contact lenses are known in the art. In particular, eyeglasses to assist colorblind users are known. For example, in U.S. Pat. No. 4,300,819, Taylor teaches glasses with one clear and one colored lens, which assist colorblind users in distinguishing between colors that they normally find difficult to distinguish. Variations on this invention have included for example glasses with lenses of two different colors, as taught by Davis in U.S. Pat. No. 5,917,573, and glasses that can be manufactured with lenses that provide various shapes of spectral filters, as taught by Chen in US Patent Publication US20110090453. Contact lenses using the same principle of coloring one of the lenses are also known, as taught for example by Zeltzer in U.S. Pat. Nos. 3,586,423 and 3,701,590. These devices use analog filters and color masks to modify the light reaching a user's eye. They are therefore limited to the specific color filtering provided by the individually configured lenses. Since analog filters can only remove or attenuate light of particular wavelengths, these filters also typically darken the resulting image, which may often reduce visibility. Analog filters do not have the ability to add or amplify light, which would be useful in some situations where normal light is too low, such as for night vision.

Other types of vision enhancement devices include "night vision" goggles and cameras, which use more specialized (often analog) technique to represent a particular non-visible set of frequencies. Here, most normal color images are replaced by a nearly monochromatic image showing a mapping of infrared light to a visible image.

More recently some computer and mobile phone based systems have emerged that provide limited digital processing of images to assist colorblind users. For example, Jones in US Patent Publication US20140153825 teaches a technique to add patterns to specified colors for display of images on a screen.

While the devices and techniques known in the art have proven helpful to some users, they have not provided full color vision to colorblind users. They have also been designed for very specific applications or categories of users. No general-purpose digitally programmable vision enhancement device is known in the art that can provide a flexible, configurable system for altering and enhancing images. No known system or method can alter or enhance images in multiple ways, including color transformations, addition of graphics or captions, magnifying images, or generating images that vary over time. No known systems provide flexible transformation and augmentation of images in the visible spectrum along with display of invisible frequencies such as infrared or ultraviolet. No known systems integrate such general and flexible image transformations into a vision enhancement device that can be embedded in glasses, contact lenses, binoculars, or other vision devices.

For at least the limitations described above there is a need for an image transforming vision enhancement device.

BRIEF SUMMARY OF THE INVENTION

One or more embodiments described in the specification are related to an image transforming vision enhancement device. Embodiments of the invention may include or otherwise utilize one or more cameras, one or more displays, and one or more processors. At least one embodiment transforms images captured from the cameras and projects the transformed images onto the displays. Some embodiments may associate displays with the eyes of a user; for example there may be left display positioned near the user's left eye and a right display positioned near the user's right eye. The image transformation may perform any desired transformation on the images, including without limitation color transformation, for example mapping colors to different colors, magnification, cropping, rotation, scaling, selection, and overlay of graphics or labels and time-shifting techniques that for example vary intensity over time or flash or show patterns in particular areas having a color or range of colors. Color transformations map values from one or more camera color spaces to one or more display color spaces. Embodiments may use any convenient color spaces, including without limitation RGB, RGBA, HSV, HSL, HSI, indexed color, or any other color representation.

One or more embodiments of the invention include displays that are configured to be placed or worn proximal to one or both of the eyes of a user. Such embodiments may for example be embedded in eyeglasses, sunglasses, contact lenses, monocles, visors, helmets, diving helmets, diving masks, welding helmets, goggles, protective eyewear, or other vision devices. In some embodiments, one or more cameras may be configured to aim in the direction of the user's normal sight and to cover all or part of the user's normal field of view. The cameras may also be embedded in the vision devices, or they may be external in some embodiments. For example, in some embodiments the cameras may be placed along the front of the lenses of eyeglasses, and the backs of the lenses may consist of displays that show images generated by the image transformation function executed in the system's processor. In some embodiments of the invention all of the components may be miniaturized and embedded in normal eyewear, for example in glasses, contact lenses or intraocular lenses.

In one or more embodiments of the invention, some or all components of the system may be embedded in devices that are not typically worn by a user, but are viewed or viewable by one or more users. Such devices may for example include a television, a movie screen, a stadium monitor, a kiosk, a game system, a desktop computer, a laptop computer, a tablet computer, a mobile phone, a personal digital assistant, a medical device, a scientific device, or any device that a user may employ to view pictures, photos, graphics, media, videos, or other information. Devices may be viewed or viewable by a single user, or by a group of users, including potentially large groups of users such as a crowd at a theater or a sporting event. In one or more embodiments the display or displays of the system may be connected to a network, and the displays may receive images via the network. The network may be wired or wireless. The network may be public or private, and it may be a wide area network, a metropolitan area network, a local area network, or any network that may deliver images from one location or device to a different location or different device. In one or more embodiments the network may be the public Internet, and the delivery of images may include for example display of images on a web page, or streaming of video or other media over the Internet. Embodiments that support Internet delivery of images may for example embed image transformation functions into web servers, proxy servers, browsers, Internet Service Provider gateways, or any other node or nodes in the transmission path between the source of the image and the display.

One or more embodiments provide a zoom capability to magnify, or to reduce magnification, of the camera images. Magnification levels may be either fixed or variable, and may or may not be under user control. Embodiments with magnification capabilities may be embedded for example in binoculars, a monocular, a telescope, or a microscope. Magnification capabilities may also be provided in embodiments that are embedded in glasses or contact lenses or other traditional eyewear.

One or more embodiments combine images from two or more cameras onto a single display image. For example, such an embodiment may provide a picture-in-picture display with the main image representing a user's forward vision, and a smaller in-picture display coming from a backward-facing camera. Some embodiments may include cameras aiming in all directions and may combine images from these cameras into a complete panoramic display for the user. Embodiments with multiple cameras may provide cameras that aim in directions that the user cannot normally see, such as backwards, sideways, or up. Embodiments may include non-aligned cameras or other transformation techniques to correct heterotropia for example.

In some embodiments the image transformation functions may vary across displays. For example, a left eye display transformation may be different from a right eye display transformation. Colors in a camera image may be mapped to different colors in a left display and a right display, for example. Such embodiments may for example support 3D vision using anaglyph techniques that apply different color filters to a stereoscopic image Embodiments of the invention provide vision enhancement capabilities to assist colorblind users. Such users have difficulty distinguishing between certain colors. The image transformation functions of these embodiments may map colors that are difficult or impossible for a colorblind user to distinguish into different colors that such a user can easily distinguish. For example, the brightness of colors may be selectively altered to make color differences more apparent. As opposed to the typically used technique to correct colorblindness by providing an analog colored filter in one lens of a pair of glasses, which has the effect of making overall images darker, one or more embodiments of the invention may for example use the opposite technique of adding brightness in selected wavelengths to assist with color differentiation. This technique of adding brightness is not possible in the analog filters of the prior art because analog filters can only remove or attenuate light in selected wavelengths. Embodiments that add brightness to selectively provide significant benefits over the inherently subtractive filters in the prior art, because the overall brightness of an image may be preserved or enhanced.

In one or more embodiments, the image transformation function may modify a subset of the pixels of the camera images, where the desired subset is specified by an image mask. Embodiments may define an image mask using any desired pixel characteristics, including for example a range or a set of ranges of colors determining which pixels are included in the image mask. Image masks defined by pixel characteristics are adaptive masks that are determined for each image based on the contents of that image. Embodiments may also use fixed image masks that select subsets of pixels based on fixed geometric boundaries. Embodiments may use combinations of adaptive image masks and fixed image masks. Pixels selected by an image mask or a combination of image masks may be modified after selection in any desired manner. One or more embodiments transform images to highlight pixels or regions with colors in a particular range of interest. For example, selected colors may be brightened to make them stand out more clearly. Other embodiments may place graphics or labels near or around regions with specified colors to make them clearer to a user. Such embodiments may for example have industrial applications for inspections, where subtle color differences may signal important issues but where such subtle color differences may be difficult to discern without image enhancement.

One or more embodiments of the invention modify the brightness of selected pixels, in order to improve visibility of dark scenes or regions, or to reduce excessive brightness or glare of overly bright pixels or regions, or both. Such embodiments may assist with nighttime or low-light vision. An example application is an embodiment that darkens colors above a certain level of brightness in order to reduce glare from headlights of oncoming or following cars. In some embodiments the image transformation could both darken excessively bright pixels and brighten excessively dark pixels; this combined effect provides additional advantages for nighttime driving where excessive glare and poor visibility in darkness are both potential problems. Such an embodiment may for example be embedded in driving glasses, or into the windshield or rear-view mirror or other component of a car or other moving vehicle.

One or more embodiments provide capabilities that allow users to see light frequencies outside the human visible frequency range. Cameras in these embodiments may capture frequencies such as infrared or ultraviolet, or any other electromagnetic frequency such as gamma rays, x-rays, microwave, or radio waves. Any sensor that can capture any range or any set of ranges of the electromagnetic spectrum may be used as a camera in embodiments of the invention. In embodiments that capture non-visible frequencies, the image transformation functions of these embodiments may map these invisible frequencies into visible frequencies for display. Illustrative applications for such embodiments may include for example visualizing heat losses, monitoring radiation levels for safety, searching for hidden transmitters and hidden listening or recording devices, and configuring and optimizing wireless networks. Various techniques may be used to map invisible frequencies into the visible frequency range. In some embodiments, the image transformation function partitions the display color space into two subspaces: one subspace is used to represent visible frequencies, and the other is used to represent invisible frequencies. For example, if the display color space is RGB, then the red component may be used to represent invisible (such as infrared) frequencies, and the green and blue components may be used to represent visible frequencies. Some embodiments simply discard certain visible frequency information and use the remaining visible spectrum to represent invisible frequencies. Some embodiments instead compress the visible frequency range rather than discarding portions of it. For example, in one or more embodiments the camera color space and display color space may be HSV (hue-saturation-value) or some similar color space. In these embodiments the hues of visible frequencies are typically represented as angles within the range 0 to 360. This range of 0 to 360 may be compressed, for example to the range 0 to 240, leaving a range of hues for representation of invisible frequencies like infrared. Embodiments using visible frequency compression provide the benefit that distinct colors are typically mapped to distinct colors, although the differences between colors may be reduced.

One or more embodiments may combine visible frequencies and invisible frequencies onto one or more displays. For example in an embodiment with a left eye display and a right eye display, one display may show visible frequencies, and the other display may show invisible frequencies (where these invisible frequencies are transformed into visible frequencies using any desired transformation function). In another embodiment, invisible frequencies may be shown in a picture-in-picture display inserted into or beside an image showing visible frequencies. In another embodiment, one or more displays may alternate between displaying visible frequencies and displaying invisible frequencies, either at a fixed rate or upon receiving input from a user to change the displayed frequency range. Any method of combining several light frequency ranges onto one or more displays is in keeping with the spirit of the invention. With these techniques embodiments of the invention may effectively broaden the range of light frequencies that are visible to a user beyond the normal range of human vision. Moreover the specific frequencies made visible to a user or emphasized in an image display may be customized to the requirements of a particular application.

One or more embodiments map camera images into a time sequence of display images. Information of interest in the camera images may therefore be encoded in the time varying features of the display image sequence. For example, to assist a colorblind user in distinguishing between colors, different colors may be represented as pixels that flash on and off at different frequencies. Embodiments may vary the range of colors or the period of repetition to highlight or differentiate selected colors or other features.

One or more embodiments may add labels, captions, graphics, or other decorations to the display images. For example, embodiments may add labels for selected colors to regions of those colors; these labels may help colorblind users understand the color content of an image. Labels or captions may also be used to highlight any feature of interest in a camera image.

One or more embodiments provide a user interface, or multiple user interfaces, to support configuration or customization of the image transformation function. User interfaces may include physical input devices such as switches, buttons, or joysticks; they may include screens with mouse, keyboard, touchscreen, stylus, or touchpad input; or they may include voice input or any combination thereof. Screens or input devices may be components of any device, including for example, and without limitation, a desktop computer, server computer, laptop computer, tablet computer, mobile phone, smart phone, pager, radio, smart watch, graphics tablet, game controller, or personal digital assistant. In general, embodiments may use any device or combination of devices to accept user input. Some embodiments provide user interfaces that provide for camera control as well, such as modifying the zoom or field of view of one or more of the cameras of the system.

BRIEF DESCRIPTION OF THE DRAWINGS

The above and other aspects, features and advantages of the invention will be more apparent from the following more particular description thereof, presented in conjunction with the following drawings wherein:

FIG. 4A illustrates an embodiment of the image transforming vision enhancement device where the display is embedded in a computer screen, and the device transforms images as they are sent from a server over a network to the computer.

FIG. 5 illustrates an embodiment of the image transforming vision enhancement device that is embedded in a monocular with a zoom capability.

FIG. 6 illustrates an embodiment of the image transforming vision enhancement device that is embedded in eyeglasses, with a backward facing camera in addition to front facing cameras, and a picture-in-picture display combining the back image with the front images.

FIG. 7 illustrates an embodiment of the image transforming vision enhancement device that is embedded in eyeglasses, with different image transformation functions applied to the left eye image and the right eye image.

FIG. 8 illustrates an embodiment of an image transformation function that enhances color vision for a red-green colorblind user, by mapping colors that such a user cannot distinguish into colors that the user can easily distinguish.

FIG. 9 illustrates an embodiment of an image transformation function that highlights pixels within a designated color range.

FIG. 10A illustrates an embodiment of an image transformation that both reduces glare and brightens dark areas of an image, for example in order to assist with night driving.

FIG. 11 illustrates an embodiment of an image transformation function that allows a user to see infrared frequencies, by mapping these frequencies into the visible spectrum.

DETAILED DESCRIPTION OF THE INVENTION

An image transforming vision enhancement device will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
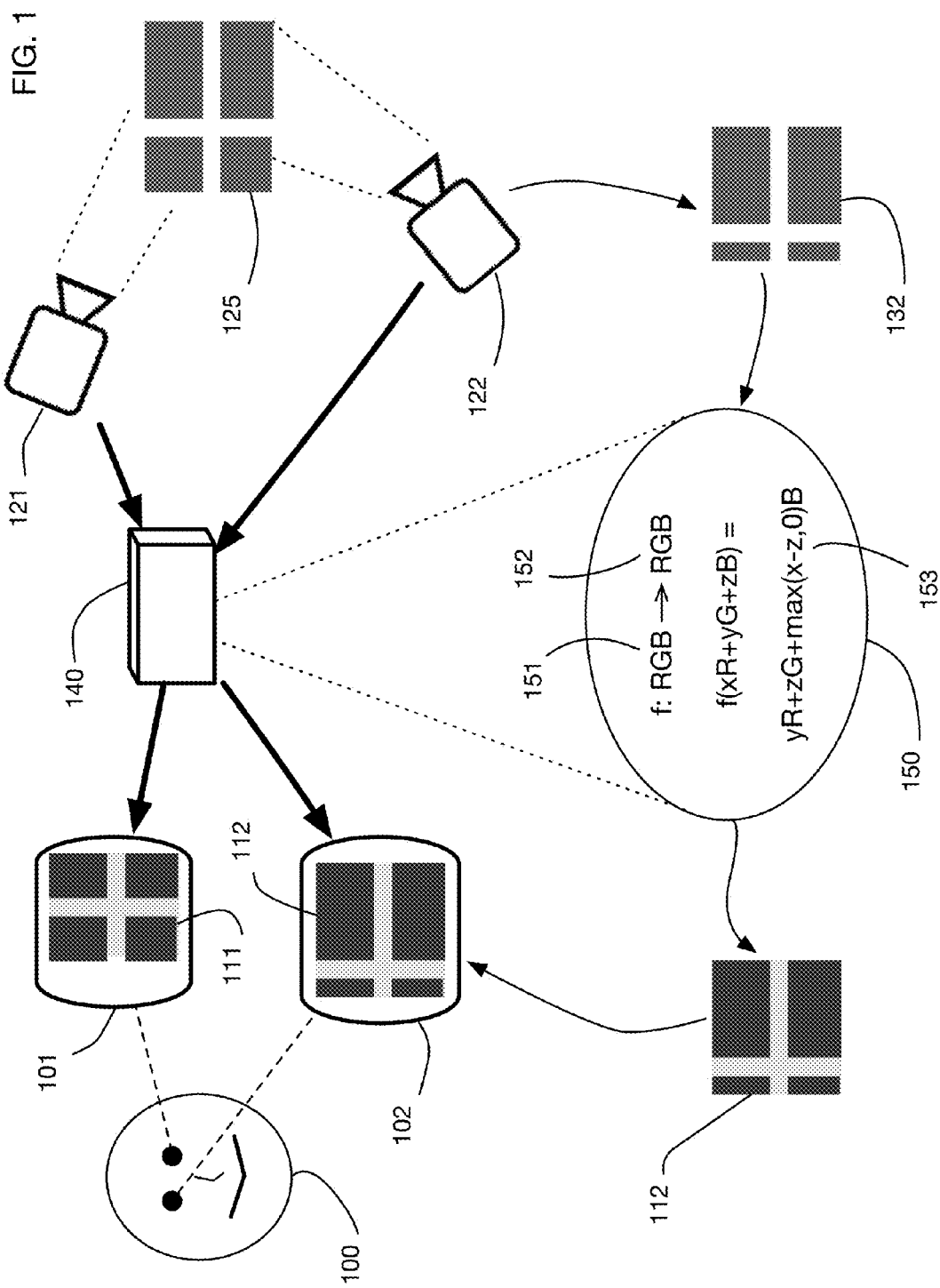
FIG. 1 illustrates an architectural view of at least one embodiment of the image transforming vision enhancement device, showing elements that include cameras, displays, a processor, and an image transformation function.

FIG. 1 shows an architectural view of an embodiment of an image transforming vision enhancement device. User 100 is depicted using the device, although in some embodiments multiple users may use the device simultaneously or sequentially. For example, some embodiments may project images onto one or more common displays that multiple users can view. In other embodiments users may have individual displays, but may share common cameras so that all users can view the same image or variants of the same image.

The embodiment shown in FIG. 1 has two cameras 121 and 122. Other embodiments may be implemented with only one camera, or may have more than two cameras. In this embodiment both cameras capture views of scene 125, and send the captured camera images to processor 140. In some embodiments the fields of view of multiple cameras may not overlap at all, but instead they may provide vision in multiple directions. Some embodiments may use more than one processor to receive and transform images. For example, in some embodiments a processor may be associated with each camera or with each display. Embodiments may use any communications technology to send camera images to the processor or processors 140, including both wired and wireless communication. The processor or processors may be located near the cameras, near the displays, or remote from both the cameras and the displays. The processor or processors may be microprocessors embedded in devices such as glasses or binoculars, or they may be computers such as personal computers, laptops, tablets, mobile phones, or servers. Any computing device or network of computing devices capable of receiving and transforming images may be used as a processor for the device.

Processor 140 executes an image transformation function 150 that maps camera images into display images. The image transformation function may be implemented in hardware, in microcode, in software, or using any combination thereof. The image transformation function transforms images received from cameras such as 121 and 122 into images that are shown on displays visible to the user. In the embodiment shown in FIG. 1 there are two displays 101 and 102. For example, displays may be placed in front of the eyes of user 100, with a separate display for each eye, as in FIG. 1 where the left eye of user 100 sees display 101 and the right eye of user 100 sees display 102. Other embodiments may utilize a single display, or more than two displays. Displays may be configured to be viewed by a single eye, or by both eyes of a user simultaneously, or by multiple users either at different times or simultaneously.

In FIG. 1 the camera image 132 is captured by camera 122. Image transformation function 150 maps image 132 into display image 112, which is shown on display 102 and is viewed by the right eye of user 100. Similarly the image from camera 121 is transformed into image 111, and is shown on display 101, which is viewed by the left eye of the user. Other embodiments may have different numbers and configurations of cameras or of displays. Any configuration or number of displays and cameras is in keeping with the spirit of the invention.

In FIG. 1, image transformation function 150 provides a color transformation. The function maps colors of camera pixels into colors of display pixels. In some embodiments the image transformation function may provide transformations other than or in addition to color transformations. For example, embodiments may include image transformation functions that rotate, scale, crop, translate, shift, reflect, blur, sharpen, resample, oversample, subsample, convolve, lighten, darken, or otherwise modify images in any desired manner. Images may also be combined or overlaid with one another or with other graphics, they may be combined as picture-in-picture displays, tiled displays, interleaved or striped displays, and they may be annotated with labels, icons, shapes, hyperlinks, legends, or any other desired annotation, explanation, or decoration, or shown with time-shifting techniques to vary intensity over time, flash one or more colors or ranges or include a pattern in an area for example.

The embodiment of image transformation function 150 maps colors in camera color space 151 into colors in display color space 152. FIG. 1 shows an illustrative image transformation in which both the camera color space 151 and the destination color space are RGG (red-green-blue) color spaces. Any desired color space or spaces may be used for either of the camera color space or the display color space. Color spaces other than RGB may include, without limitation, RGBA, CMY, CMYK, HSV, HSL, HSI, indexed color spaces, or any convenient means of representing colors with tuples of values. Such color spaces may or may not include alpha components representing transparency. Color spaces may also consist of multidimensional vectors of color tuples, where a particular input color tuple value (such as for example an RGB tuple) is mapped into multiple output color tuples (such as for example a sequence of RGB tuples). These multidimensional color spaces may be used in one or more embodiments to map input pixels into a time sequence of output pixels, where the output time dimension provides an extended dimension for the output color space. In FIG. 1 the illustrative image transformation function is defined by formula 153. This particular formula is for illustration only; embodiments may use any desired mapping defined by formulas, algorithms, software, tables, graphs, or any other means of representing functions from the source color space to the target color space. In the illustrative formula 153, color values in the camera color space are represented as xR+yG+zB, where x, y, z are values in the range 0 to 255. This color space represents colors as 8 bits per channel, for each of the 3 channels R, G, and B. Embodiments may use any desired number of bits for any color channel. The illustrative formula 153 maps xR+yG+zB into yR+zG+max (x−z,0)B. FIG. 1 illustrates the effect of this mapping on the colored camera image 132, which contains a cross of white (RGB=255,255,255) on a background of red (RGB=255,0, 0). White is mapped to value 255*R+255*G+(255-255) *B=255R+255G, which is yellow. Red is mapped to value 0R+0G+255B, which is blue. Thus the output 112 is a yellow cross on a blue background. This image 112 is shown on display 102. A similar transformation is done on camera image from camera 121, generating display image 111, which is shown on display 101. In this illustrative embodiment, the color transformation on the two camera images is identical; the display images differ only in that they capture different fields of view of the target scene 125. Other embodiments may use different image transformations for the images from different cameras. In addition, any mapping of color outside of visible ranges for example may be utilized, which may for example utilize any other color space for example and use of RGB in this figure is exemplary only.

Figure 2:
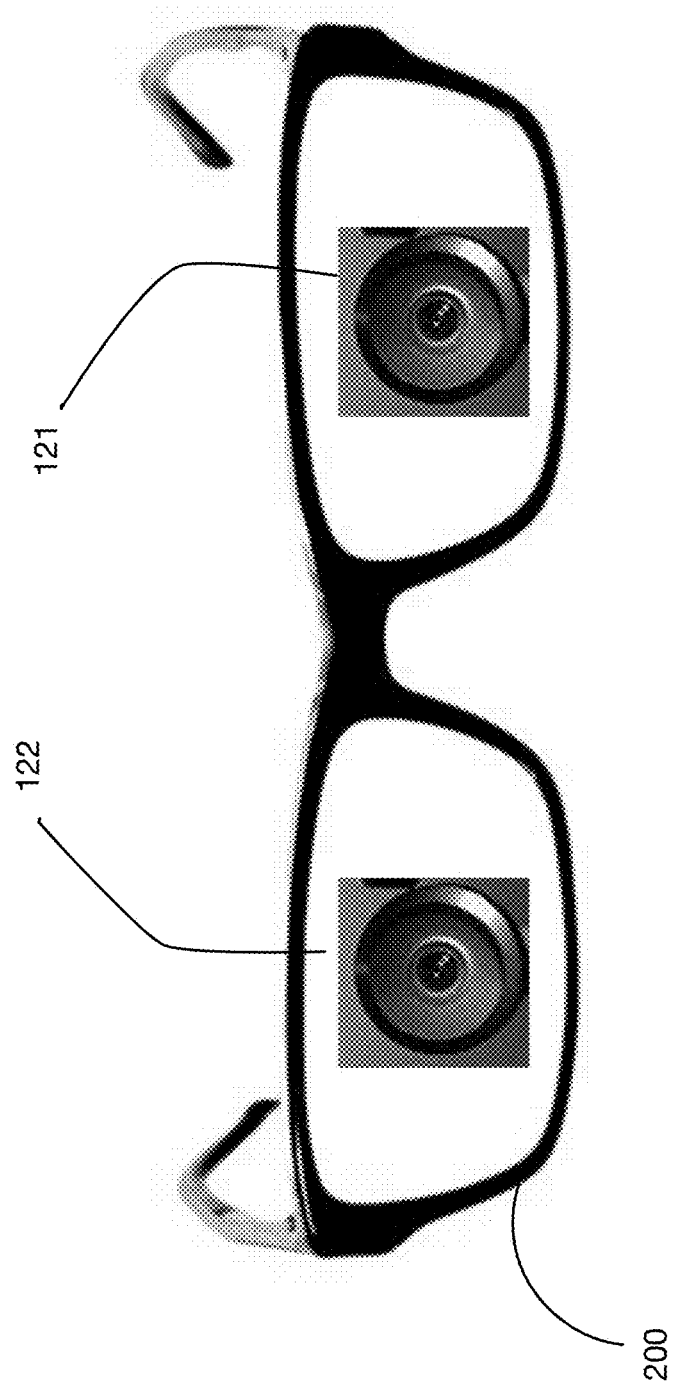
FIG. 2 illustrates a front view of an embodiment of the image transforming vision enhancement device that is embedded in eyeglasses.

FIG. 2 illustrates a front view of an embodiment where the cameras and displays are embedded in eyeglasses. Embodiments may embed all or some of the components into any other devices, including without limitation eyeglasses, sunglasses, contact lenses, intraocular lenses, a monocular, binoculars, telescopes, microscopes, intraocular lenses, monocles, goggles, helmets, diving helmets, diving masks, welding helmets, protective eyewear, mirrors, visors, windows, windshields, televisions, game consoles, virtual reality displays or glasses or helmets, desktop computers, laptop computers, notebook computers, internet appliances, tablet computers, mobile phones, smart phones, personal digital assistants, pagers, radios, smart watches, medical devices, scientific devices, stadium monitors, or movie screens. In eyeglasses 200 of FIG. 2, left camera 121 is embedded in the front of the left lens of the glasses, and right camera 122 is embedded in the front of the right lens of the glasses. The cameras are oriented to point forward and to provide images that overlap with the normal field of view of the user. In some embodiments the camera or cameras may be oriented to capture all or a portion of the user's normal field of view. Such embodiments can provide augmentation for the user's normal vision. In other embodiments one or more cameras may be oriented to capture areas that are partially or completely outside the user's normal field of view. For example and without limitation, such other areas may include areas behind, above, below, or to the sides of the user, or in front of user and with a wider field of view. Some embodiments may employ cameras that are remote from the user. Such embodiments may supplement the user's normal vision with additional fields of view that the user would not normally see without the vision enhancement device. One or more embodiments embedded in glasses or other eyewear may also include one or more cameras pointing at the user's eyes, and one or more displays located on the outside surface of the lenses where images of the user's eyes are displayed; these additional cameras and displays provide eye contact to another person interacting with the user, which may otherwise be absent if the user's eyes are occluded by the displays on the inner surface of the lenses.

Figure 3:
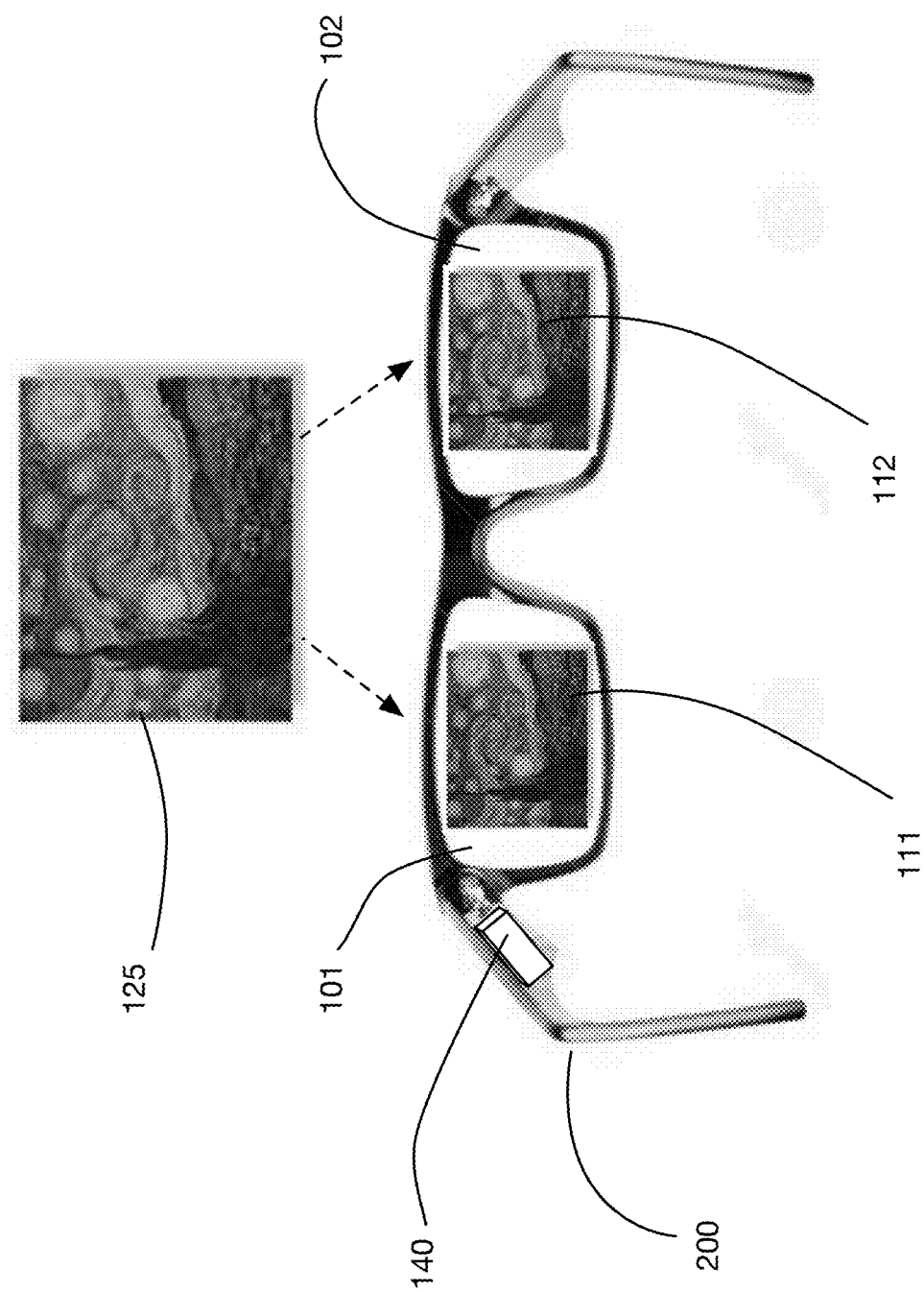
FIG. 3 illustrates a back view of the embodiment shown in FIG. 2.

FIG. 3 shows a back view of the embodiment illustrated in FIG. 2 with the vision enhancement device embedded in eyeglasses 200. In this embodiment the cameras 121 and 122, the displays 101 and 102, and the processor 140 are all embedded in eyeglasses 200. Other embodiments may have some or all of these components external to the eyeglasses or other device. For example, in some embodiments the user may have eyeglasses with displays at the lenses of the eyeglasses, where cameras are external to the eyeglasses to provide a view of a different scene. The processor 140 similarly may be either internal to or external to the eyeglasses or similar device. In the embodiment shown in FIG. 3 the processor 140 is located along the left side of the eyeglasses frame; other embodiments may place the processor or processors in any convenient location. The cameras capture left and right images of scene 125, transform the images using processor 140, and project the transformed images 111 and 112 onto displays 101 and 102 respectively that are located on the back of the lenses of the glasses 200.

Figure 4:
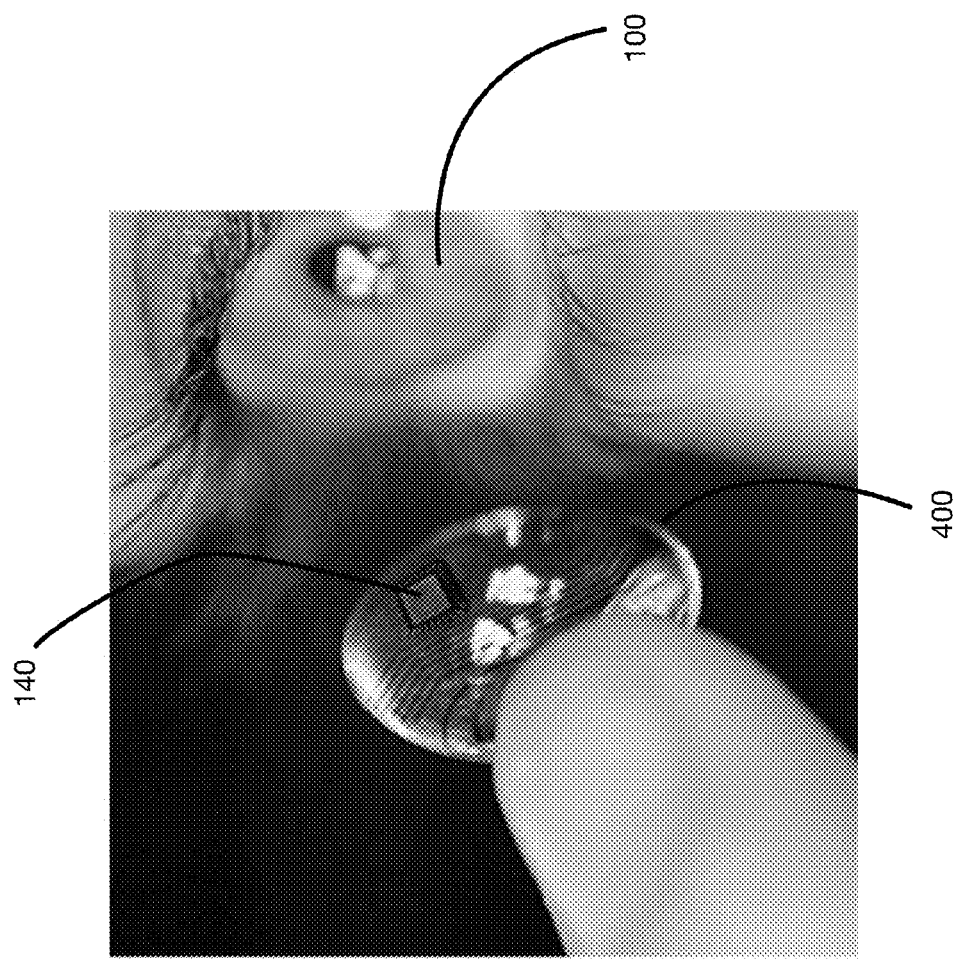
FIG. 4 illustrates an embodiment of the image transforming vision enhancement device that is embedded in a contact lens.

In one or more embodiments the vision enhancement device may be fully or partially embedded in contact lenses, as illustrated in FIG. 4. Contact lens 400 includes processor 140 that processes images captured from a camera on the front of the lens, and projects the transformed image onto the display on the back of the lens to be viewed by user 100. As with embodiments embedded in eyeglasses, some of the components may be external to the contact lens in one or more embodiments.

In one or more embodiments components of the vision enhancement device may be fully or partially embedded in a television, a monitor, a kiosk, a server computer, a laptop computer, a desktop computer, a notebook computer, a tablet computer, a smart phone, a smart watch, a personal digital assistant, or in any other device that can send, transmit, receive or display images. FIG. 4A illustrates an embodiment in which the display of the vision enhancement device is the display of a laptop computer. Other elements of the vision enhancement device are distributed on nodes that communicate via a network. In the embodiment shown in FIG. 4A, server 4A01 provides a virtual or real camera that captures or stores camera images, and serves these camera images to clients over network 4A20. Images may be served for example as parts of web pages, video streams, other media streams, emails, or embedded in any other content delivered over a network. Network 4A20 may be the Internet, or it may be any public or private network including, without limitation, a wide area network, a metropolitan area network, a local area network, or a personal area network. Network 4A20 may consist of wired links, wireless links, or any combination thereof. Camera image 132 is stored or captured on server 4A01; it contains an image of a face with a red color. In the illustrative embodiment shown in FIG. 4A, the desired image transformation function 150 exchanges the red channel and the blue channel of the image, where the image pixel values are in the RGB color space. The transformed image is displayed on client computer 4A02 as display image 112. After the image transformation the display image 112 has a blue face. This transformation function is illustrative; embodiments may use any desired image transformation function to alter images in any manner.

FIG. 4A illustrates three alternatives for the organization of the image transmission path and the location of the processor that executes image transformation function 150.

Embodiments may use any of these three alternatives, or combinations of these alternatives. In transmission path 4A11, the image transformation function 150a is performed on server computer 4A01, or on a processor proximal to this server computer. The transformed image is then sent across network 4A20 to client 4A02. The server computer may select different image transformation functions for different clients, based on any client parameters or client requests. In transmission path 4A12, the image transformation function 150b is performed on the client computer 4A02, or on a processor proximal to this client computer. For example, the image transformation function may be embedded in a browser displaying web pages, or in an email client displaying emails or email attachments. In transmission path 4A13, camera image 132 is transmitted first to proxy server 4A03, which executes image transformation function 150c. The transformed image is then sent over network 4A20 to client 4A02. Use of any or all of these transmission paths to deliver modified images to any client is in keeping with the spirit of the invention.

FIG. 5 illustrates an embodiment of the invention embedded in monocular 500. The embodiment shown has a single camera 121 on the front lens of the monocular, a single display 101 on the eyepiece of the monocular, and processor 140 (not shown) is installed in the interior of the monocular. Other embodiments may have cameras, displays, or processors external to the monocular device. Other embodiments may embed components into devices such as for example binoculars, telescopes, or microscopes. In the embodiment shown in FIG. 5, image transformation function 150 provides a zoom capability, as well as a capability to increase the brightness of dark scenes. In some embodiments a zoom capability may be provided in the camera or cameras instead of or in addition to in the image transformation function. In the embodiment shown, camera 121 captures a portion 501 of scene 125, here an upper left portion. The camera image 501 is magnified 5 times by image transformation function 150, and then presented as magnified image 111 on display 101. Other embodiments may use different magnification factors, or provide a range of adjustable magnifications. Image transformation function 150 also provides a color transformation between source and destination images. In the embodiment shown, HSL (hue-saturation-lightness) color spaces are used for camera color space 151 and for display color space 152, with H, S, and L scaled to be in the ranges [0,360], [0,1], and [0,1] respectively. The color transformation formula 153 increases the lightness of each pixel by up to 3×, by replacing lightness z with max(3z,1). Thus dark pixels (with a small z) are mapped into brighter pixels for better visibility. Other embodiments may use different formulas or color transformations to increase visibility of dark images. Some embodiments may employ thresholds to increase the brightness of pixels that are below a particular value of lightness. Some embodiments may use color spaces other than HSL to define appropriate color transformations, and they may use camera color spaces that differ from display color spaces. Some embodiments may attenuate the brightness of excessively bright images or bright image regions, instead of or in addition to increasing the brightness of dark images or dark regions.

In one or more embodiments, the image transformation function may combine images from multiple cameras onto a single display image. FIG. 6 illustrates such an embodiment with the components of the embodiment embedded into eyeglasses 200. In this embodiment there is a backward-facing camera 601 in addition to the two front-facing cameras on the front of the lenses of the glasses. Camera 601 captures an image of scene 602 that is behind the user. Front facing cameras capture left and right images of scene 125. The image transformation function combines the back image and the right image into left display image 111 and right display image 112. In this embodiment, the back image is shown as a picture-in-picture insert 611 in image 111, and as a picture-in-picture insert 612 in image 112. Other embodiments may combine images in other ways, such as for example side-by-side, top-and-bottom, blended, morphed from one image to another, tiled, striped horizontally, striped vertically, striped diagonally, or alternating in time. Any method of combining multiple images into single displays is in keeping with the spirit of the invention. Embodiments may also combine more than two camera images into a display image; for example camera images from many different angles may be combined into a single panoramic display image. Some embodiments of the invention therefore provide a complete 360° field of view for a user, or a field of view covering an entire sphere surrounding a user.

In one or more embodiments the image transformation function may apply different transformations for different displays. FIG. 7 illustrates an embodiment with different image transformation functions for the left eye image and the right eye image. One or more cameras capture images of scene 125. Camera images are provided to left image transformation function 150a and right image transformation function 150b. In the example illustrated, these two image transformation functions perform different color mappings on the camera images. The example shown applies different color filters to the separate eyes: the left eye image contains only blue, and the right eye image contains only green. This example is only illustrative; any transformations may be applied to generate different display images for different displays. Use of separate display-specific image transformation functions may be applied for example to generate 3D vision using standard anaglyph techniques. In other embodiments image transformation functions themselves may generate 3D stereoscopic vision by offsetting pixels in left and right images using an auxiliary depth map as input to the transformations. Additional applications may include for example correction of vision problems such as cross-eyed vision or heterotropia or strabismus, where a user's eyes are not aimed directly forward.

Embodiments of the invention may be used to correct for vision deficiencies such as full or partial colorblindness. FIG. 8 illustrates an embodiment that may assist a red-green colorblind user. Such a user may find it difficult or impossible to distinguish between certain red and green pixel values. For simplicity, FIG. 8 illustrates an example where a colorblind user sees only green, and where this user also sees red pixel values as green. As shown, square 801a has a dark green color with RGB value (0,128,0) (with R, G, and B each in the range 0 to 255). Square 802a has a dark red color with RGB value (128,0,0). A normal user can easily distinguish these two colors. However the red-green colorblind user sees both squares as dark green: 801a is seen as 801b, with RGB of (0,128,0), and 802a is seen as 802b, with RGB also of (0,128,0). The colorblind user therefore cannot distinguish these colors.

In the embodiment shown in FIG. 8, image transformation function 150 separates the colors of 801a and 802a so that the red-green colorblind user can see a difference. In this illustrative example, the R, G, and B values are scaled up or down depending on the difference between red and green. Pixels with more red than green are increased in RGB intensity; pixels with more green than red are decreased in RGB intensity. Image transformation function 150 maps square 801*a* into 801*c*, with RBG value (0,64,0); this square is made darker since its green value exceeds its red value. Square 802*a* is mapped into 802*c*, with RGB value (192,0, 0); this square is made lighter since its red value exceeds its green value. The red-green colorblind user sees these transformed images as 801*d* and 802*d*, with RGB colors of (0,64,0) and (0,192,0) respectively. The colorblind user can then distinguish these colors based on their relative brightness. The transformation function illustrated in FIG. 8 is only an example of the possible transformations that can assist with colorblind vision. Appropriate transformations may depend on the specific type and degree of colorblindness of a user, as well as on the colors in the original image. Some embodiments may provide options for users to select appropriate transformations based on their specific vision issues. Other embodiments may be designed to be appropriate for particular vision types. Any transformation function or functions that assist users in distinguishing colors is in keeping with the spirit of the invention, including any time-shifting, flashing, pattern overlaying or time-varying color mapping for example or any combination thereof.

One or more embodiments of the invention may use an image transformation function that first applies an image mask to select particular pixels from a camera image, and then applies a modification to the selected pixels. An image mask may be adaptive in that it is defined by the characteristics of the pixels themselves, rather than by a fixed geometric boundary. Fixed boundary image masks may also be used instead of or in addition to adaptive image masks. As an example, one or more embodiments may use image masks that select pixels having colors in a specified color range or a set of color ranges. Modifications to the pixels selected by a color-based mask may for example be used to highlight the pixels in the specific color ranges. FIG. 9 illustrates an embodiment with an image transformation function 150 that highlights pixels with RGB values the range of (67,92,127)-(127,152,187), which is roughly a medium blue color. This range of RGB values defines an adaptive image mask based on color. For pixels in this range, the function doubles the intensity of each of the RGB values, up to the maximum value of 255. This transformation has the effect of brightening and therefore highlighting these pixels. Thus camera image 132 is transformed by function 150 into display image 112. Pixel 901, as an example, is brightened and highlighted by this transformation. Other embodiments may use different transformations to highlight pixels in specific color ranges. For example, one embodiment might transform pixels outside the selected range into grayscale pixels, while preserving the color of pixels in the designated range. Another embodiment may add graphics such as an outline or a pointer to regions in a specified color range or vary any viewing parameter over time for example. Any transformation that highlights the desired pixels is in keeping with the spirit of the invention. Some embodiments may provide user-selectable or user-configurable color ranges to be highlighted. A potential application of such embodiments might include for example inspection devices that assist inspectors in identifying specific parts or regions or articles that have known color signatures.

Figure 10:
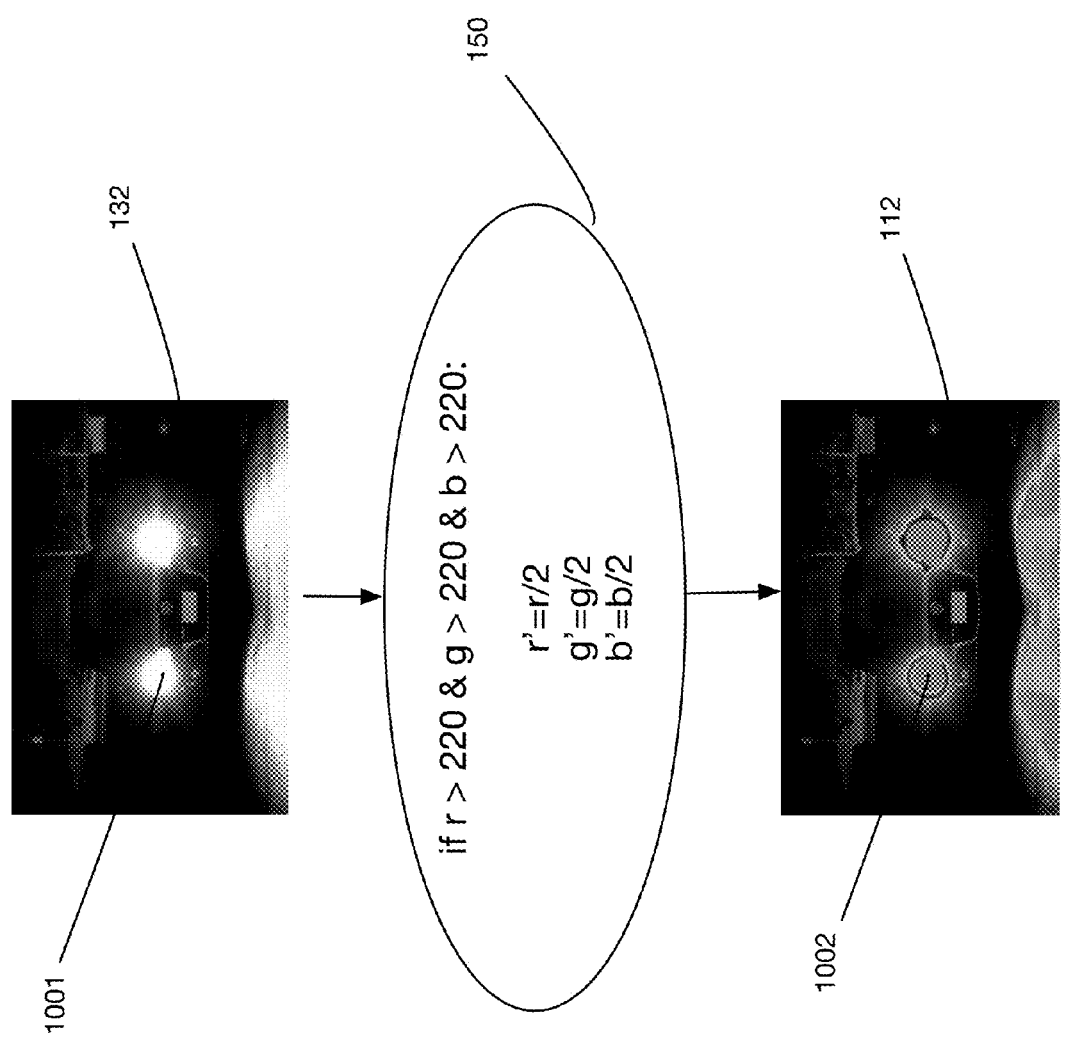
FIG. 10 illustrates an embodiment of an image transformation function that reduces glare, for example in order to assist with night driving.

One or more embodiments may alter the brightness of pixels or regions to improve visibility. As illustrated in FIG. 5, embodiments may lighten dark pixels to provide improved visibility of dark scenes. FIG. 10 illustrates the converse requirement of darkening overly bright pixels. Such embodiments may have applications for example in nighttime driving where bright headlights can be hazardous, or in industrial applications such as welding where bright emissions can be damaging. In FIG. 10 camera image 132 contains an excessively bright region 1001 corresponding to the bright headlights of a car. Image transformation function 150 attenuates the brightness of very bright pixels. In this illustrative example, pixels with R, G, and B values all above 220 have their intensity reduced by half. The resulting image 112 has darkened pixels in the previously bright areas, such as darkened area 1002 for the headlight. FIG. 10A illustrates an embodiment of the invention that simultaneously darkens excessively bright regions, and brightens excessively dark regions. This embodiment or similar embodiments provide additional advantages for example in nighttime driving applications where there is a need to simultaneously improve low-light visibility and reduce excessive glare. In the embodiment shown in FIG. 10A, as in the embodiment illustrated in FIG. 10, camera image 132 contains an excessively bright region 1001 corresponding to the bright headlights of a car. Moreover the image of the car 10A01 is very dark, making it difficult to distinguish the car from the background. Image transformation 10A02 illustrates an image transformation defined by a curve; in general embodiments may specify image transformations using any combination of techniques including, without limitation, tables, formulae, charts, graphs, curves, algorithms, software, databases, expression languages, or any other mechanism for specifying a transformation from inputs to outputs. In this example curve 10A02 defines a mapping from HSV (hue-saturation-value) space into HSV space; the illustrative transformation modifies only the value component (V-in) of each input pixel to generate a value component (V-out) of the output pixel. In other embodiments transformations may alter any or all of the channels of an image to modify brightness, colors, contrast, hues, saturation, luminance, or any other image characteristics in any desired manner. Transformations may use any desired color space or combination of color spaces; the HSV space used here is illustrative. The transformation defined by curve 10A02 amplifies the value of dark pixels (with a small V-in), and it reduces the value of bright pixels (with a large V-in). This illustrative transformation has the effect of reducing excessive glare while simultaneously boosting visibility of dark regions. The resulting display image 112 has darkened area 1002 for the overly-bright headlight. It also has a clearer, brighter image 10A03 for the car, which stands out more clearly against the dark background after applying image transformation 150.

In some embodiments devices with such brightness-altering image transformations may be embedded for example in glasses, sunglasses, contact lenses, visors, helmets, goggles, protective eyewear, or other wearable devices. The portion of the image to transform may include any alpha value and any pattern, here shown as a monochrome grey pattern for ease of illustration. One skilled in the area will recognize that the grey pixel pattern may replaced with a hash or checkerboard or any other pattern. In other embodiments they may be embedded directly in moving vehicles such as cars or trucks, for example within windshields, rear-view mirrors, visors, or any other component of the vehicle. Some embodiments may provide daytime and nighttime modes, or other modes that are time or condition specific, that alter the image transformation function to enhance vision appropriately in the different environments.

One or more embodiments of the invention may include one or more cameras that can capture wavelengths outside of the visible range of light. Such wavelengths may for example include infrared, ultraviolet, gamma waves, x-rays, microwaves, radio waves, or any other part of the electromagnetic spectrum. Any sensor that can capture a range or any set of ranges of the electromagnetic spectrum may be used as one or more cameras in embodiments of the invention. To make such wavelengths visible to a user, some embodiments may employ image transformation functions that map these wavelengths into the visible spectrum. FIG. 11 illustrates such an embodiment with a camera that captures infrared light as well as visible light. The spectrum 1101 visible to the camera ranges from blue to infrared. For illustration, FIG. 11 presumes that the camera generates pixels with 4 color channels, corresponding to blue at a wavelength of roughly 450 nm, green at roughly 525 nm, red at roughly 700 nm, and infrared at roughly 900 nm. Spectrum 1102 is a subset of 1101 corresponding to visible light; spectrum 1103 is a subset of 1101 corresponding to invisible light (which in this case is infrared). Other embodiments may use other number of color channels and may have color channels corresponding to different wavelengths; these values are for illustration only. In the embodiment of FIG. 11, image transformation function 150 maps the entire spectrum 1101 onto the visible spectrum 1102. The color space 151 corresponding to the entire spectrum 1101 is the 4-channel space RGB X IR, and the color space 152 corresponding to the visible spectrum 1102 is the 3-channel space RGB. In this example, this mapping is performed by mapping the visible spectrum 1102 onto a smaller visible spectrum 1104, which includes roughly blue and green but not red, and by mapping the invisible spectrum 1103 onto a different portion 1105 of the visible spectrum, which corresponds roughly to red. Function 150 illustrates one simple method for this mapping: in this example, the red channel is discarded, and the infrared channel is mapped onto the red channel. Other embodiments may use other techniques to map the entire spectrum onto the visible spectrum, such as discarding, combining, compressing, or modifying any or all of the channels. Mapping from discrete colors in a non-linear manner to provide false color or random mappings may be employed in one or more embodiments of the invention and range to range mapping is illustrated in FIG. 11 as an example of one type of mapping that embodiments of the invention may utilize.

Figure 12:
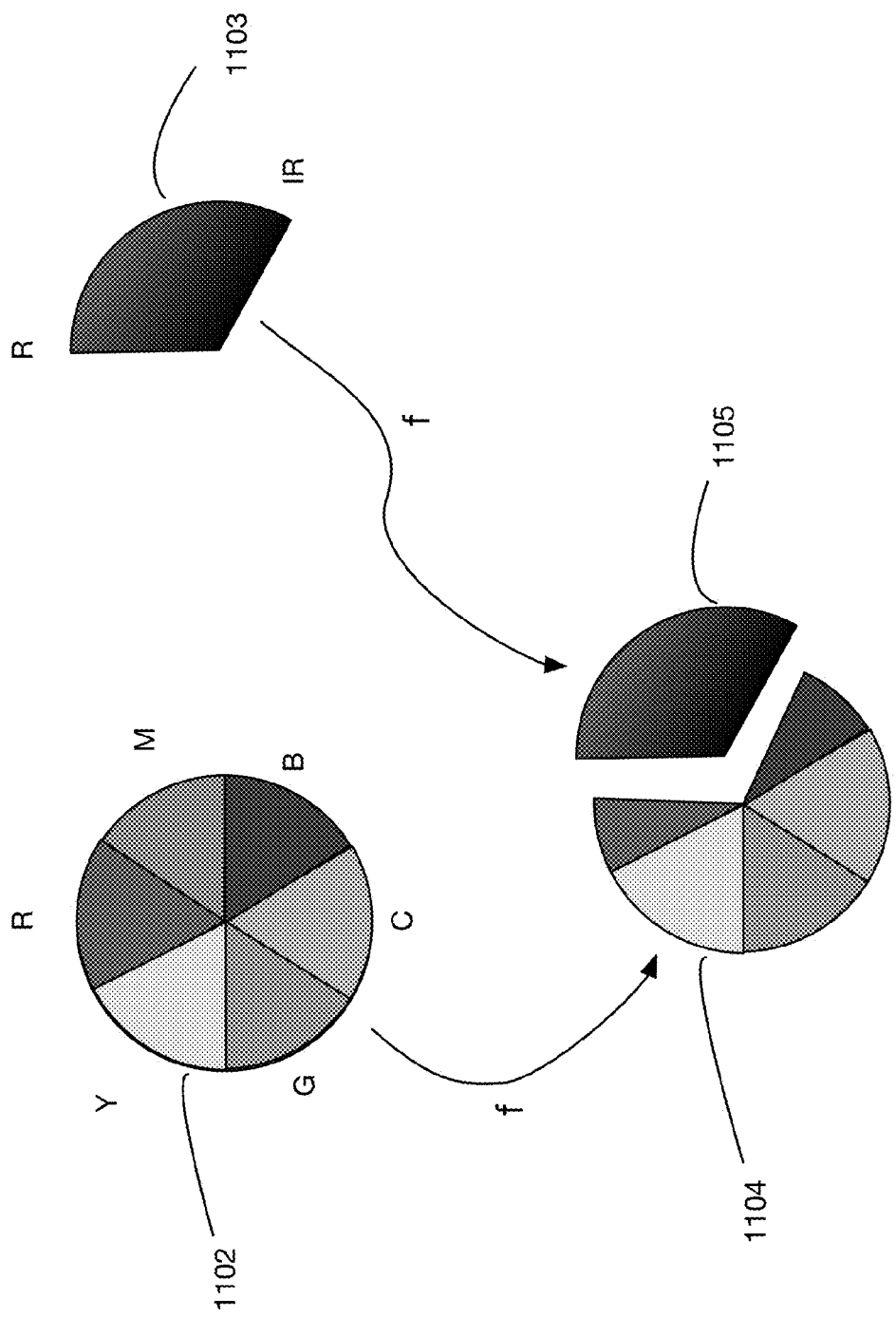
FIG. 12 illustrates a different embodiment of an image transformation function that allows a user to see infrared frequencies, by allocating a portion of the visible hue color wheel to hue representations for infrared hues.

FIG. 12 illustrates an embodiment of a different image transformation function that maps a spectrum including invisible frequencies into the visible spectrum. In this embodiment visible pixels are represented in HSV (hue-saturation-value) color space rather than in RGB. Color wheel 1102 is simplified version of a standard hue wheel for the hue component of this color space. In the embodiment shown, the camera color space, which includes infrared frequencies, expands the usual visible hue space with an additional range 1103 of hues between red and infrared. These infrared hues do not correspond to visible colors, but they can be defined and calculated easily by measuring for example the relative magnitude of red and infrared channels in a pixel. For illustration this range 1103 is shown as comprising a 120° range. In this embodiment a portion 1104 of the visible hue range 1102 is maintained unchanged by the image transformation function; the remaining portion of the visible hue range 1102 is allocated for infrared hues. Thus infrared hues in this example are mapped into visible hues 1105 between red and blue in the color wheel.

Figure 13:
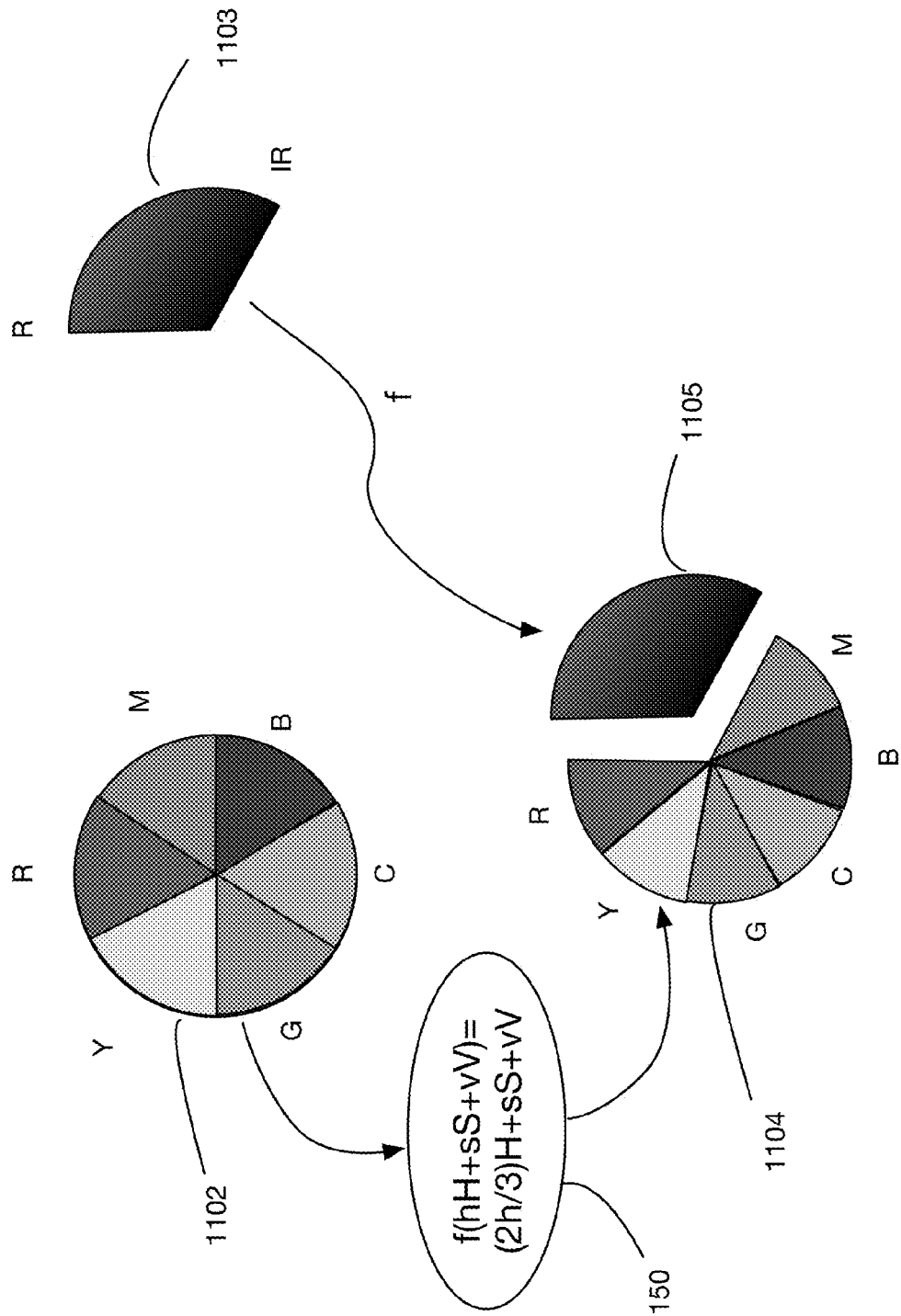
FIG. 13 illustrates another embodiment of an image transformation function that allows a user to see infrared frequencies, by compressing visible hues into a subset of the visible hue color wheel, and inserting infrared hues into the remaining hue color space.

Embodiments like the one illustrated in FIG. 12 provide simple mappings of invisible frequencies into the visible spectrum, but they lose some color information in the mapping. For example, in the embodiment of FIG. 12, two colors with identical red and infrared values, but different blue values, could be mapped into identical colors. Some embodiments preserve more color differences by compressing the visible spectrum in a one-to-one manner. FIG. 13 illustrates such an embodiment. As in FIG. 12, in this embodiment colors are represented in HSV color space, with extended hues 1103 defined between red and infrared. The visible hues 1102 are mapped into compressed hue space 1104 by function 150. This illustrative mapping scales hue values by the factor 2/3, so that the 360° visible hue space is compressed onto the compressed space 1104, which comprises 240° of the original space. This allocates the remaining 120° for the infrared hues 1103. In contrast to the embodiment of FIG. 12, the embodiment of FIG. 13 preserves color distinctions because different hues in the camera color space are mapped into different hues in the display color space. Differences are compressed in this embodiment but they are not eliminated. Other embodiments may employ different compression strategies to map colors onto compressed color spaces. For example, some embodiments may preserve all hue values unchanged within a particular hue range, and compress others into a compressed range. Combinations of techniques may be used to create visible representations of the invisible frequencies, while preserving desired aspects of the visible frequencies that are relevant for particular applications.

In one or more embodiments of the invention, one or more sensors of physical signals other than electromagnetic radiation may be used as cameras. These sensors may be used in addition to sensors detecting electromagnetic radiation, or they may be used without sensors of electromagnetic radiation. Such sensors may include for example, without limitation, microphones, sonar, Geiger counters (which may also detect radiation such as electromagnetic radiation), inertial sensors, force sensors, pressure sensors, vibration sensors, temperature sensors, strain gauges, or flow sensors. In embodiments with sensors of non-electromagnetic signals, the camera images consist of sensor measurements over time for a set of pixels that represent locations or other points of interest in the object or object being observed. These measurements may be single channel values or multi-channel values. The measurements may be made on any desired scale and within any desired range. The image transformation function in these embodiments maps the sensor values into display images using any desired function. For example, one embodiment may measure sound levels at various points and may display the sound field as a display image, with different colors corresponding to different decibel levels of sound. The mapping from sound level, or any other physical signal, into display images may be selected as desired for the specific application. One or more embodiments may employ sensor fusion techniques to integrate data from multiple sensors into one or more display images. The image transformation function in embodiments using sensor fusion maps tuples of sensor readings from multiple sensors into display images.

One or more embodiments may display information on sounds in the environment for example to assist deaf or hearing-impaired users, or to augment the hearing of users in noisy environments, or in other environments where normal hearing is difficult. For example, one or more embodiments may identify specific sounds or specific sources of sounds and may display information on these sounds on one or more displays of the embodiment. In an illustrative embodiment, for example, noises identifying particular hazards, such as sirens, car horns, or alarm bells, may be recognized by the embodiment and may trigger a display of a visual indicator of the hazard, such as for example a warning icon or a flashing color. As an example, an embodiment that normally shows camera images of the environment may have a special graphic or overlay shown when a hazardous noise is detected. The graphic may further indicate the type of noise and the intensity of the sound. In one or more embodiments, the information displayed about a sound may include indications of the direction and distance to the source of the sound. Such displays may for example include arrows and range information pointing towards the source, and they may include a map showing the location of the source. As an illustration, an embodiment that displays the direction of nearby sounds above a threshold or matching a pattern may for example alert hearing-impaired pedestrians of oncoming traffic. Sounds of interest may be determined by loudness, pitch, patterns, or any other characteristics of the relevant sounds. One or more embodiments may generate graphical overlays or labels to annotate images of objects or people in the environment based on the sounds they are generating. For example, an embodiment may use graphic overlays to highlight images of people in a camera image that are currently talking One or more embodiments may use speech recognition technology to translate spoken words into text or into other symbols that are shown on the displays of the embodiment. One or more embodiments may detect sounds outside the normal range of human hearing, and may display information about these inaudible sounds on the displays of the embodiment.

In one or more embodiments of the invention, image transformation functions may map camera images to a time sequence of display images. The time-varying characteristics of individual pixels or regions may therefore provide visual cues to users. This may include flashing a color or ranges of colors, changing the color over time to any other color or sequence of colors including a linear range, non-linear range, random mapping or any other mapping for example and may include any pattern overlay as well. In these embodiments the display color space may be viewed as a composition of a standard color space with a time axis. The time range for the time sequence of display images may be limited or unlimited. For embodiments that map a camera image to a finite sequence of display images, the sequence of display images may be repeated in some embodiments after the last display image is reached. In other embodiments the sequence of images may not repeat, but instead the last display image or the first image or any other image may be shown after reaching the end of the sequence. In some embodiments the camera or cameras may capture new camera images continuously.

One or more embodiments may generate a time sequence of display images that alternates or otherwise interleaves display of values in different frequency ranges. For example, embodiments may display the visible frequencies from a camera image for some period of time, and then switch to a display of the invisible frequencies of the camera image (such as ultraviolet or infrared or other frequencies) for another period of time. This time multiplexing of different frequency channels onto the display image may be used instead of or in addition to the frequency space mapping and compression techniques described above, that fit invisible frequencies into the visible spectrum.

To apply an image transformation that generates a sequence of display images from each camera image, some embodiments may down-sample the sequence of incoming camera images. For example, if an embodiment generates a time sequence of 10 display images for each camera image, and if a camera captures 30 frames per second, an embodiment may use every $10^{th}$ frame from the camera and generate an output for display at 30 frames per second using the image transformation function to interpolate between the resampled camera frames. Any method of displaying time-varying images is in keeping with the spirit of the invention.

Figure 14:
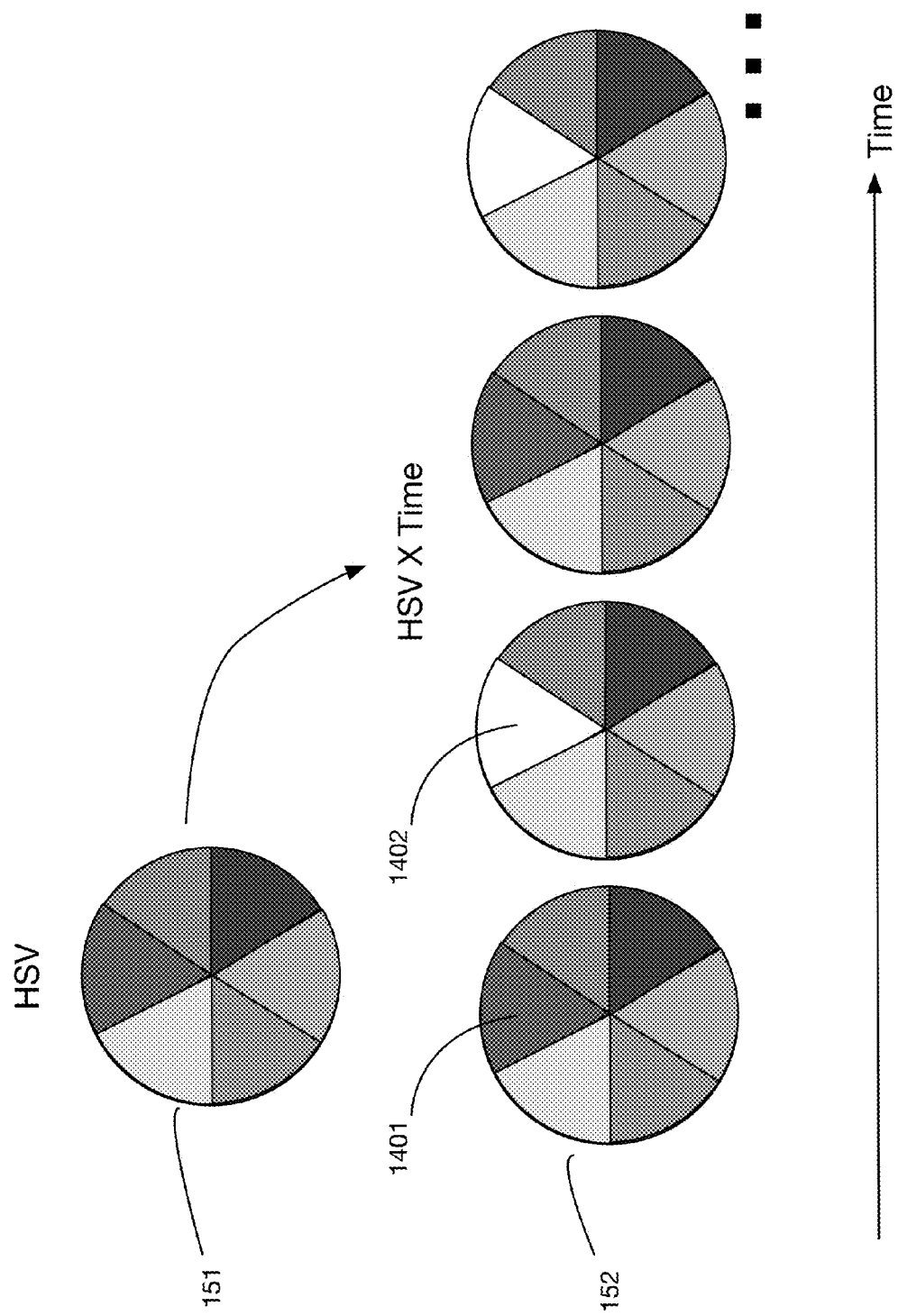
FIG. 14 illustrates an embodiment of an image transformation function that maps colors into a time-varying sequence of colors; in this embodiment colors with predominantly red hues are mapped into flashing pixel values.

FIG. 14 illustrates an embodiment of the invention that maps camera colors onto a time-varying sequence of colors in the display color space. In this example, the camera color space 151 is an HSV space, and the display color space 152 is HSV X Time, with time extending indefinitely until a new image arrives. Pixels in the red portion of the hue color wheel are mapped into alternating red pixels 1401 and white pixels 1402; other hues are unchanged. The flashing of red pixels serves to highlight those pixels for the user. Colors may alternate at any desired frequency, including at frequencies that vary in time. In some embodiments color mappings may map certain colors to continuously varying target colors over time. Some embodiments may use time-varying colors or pixels to highlight certain regions or figures or shapes, to provide flashing or scrolling captions or annotations, to provide moving graphics, to dynamically rotate, scale, blur, or otherwise modify the image, or more generally to provide any desired display of time-varying information based on the camera image input to the image transformation function.

Figure 15:
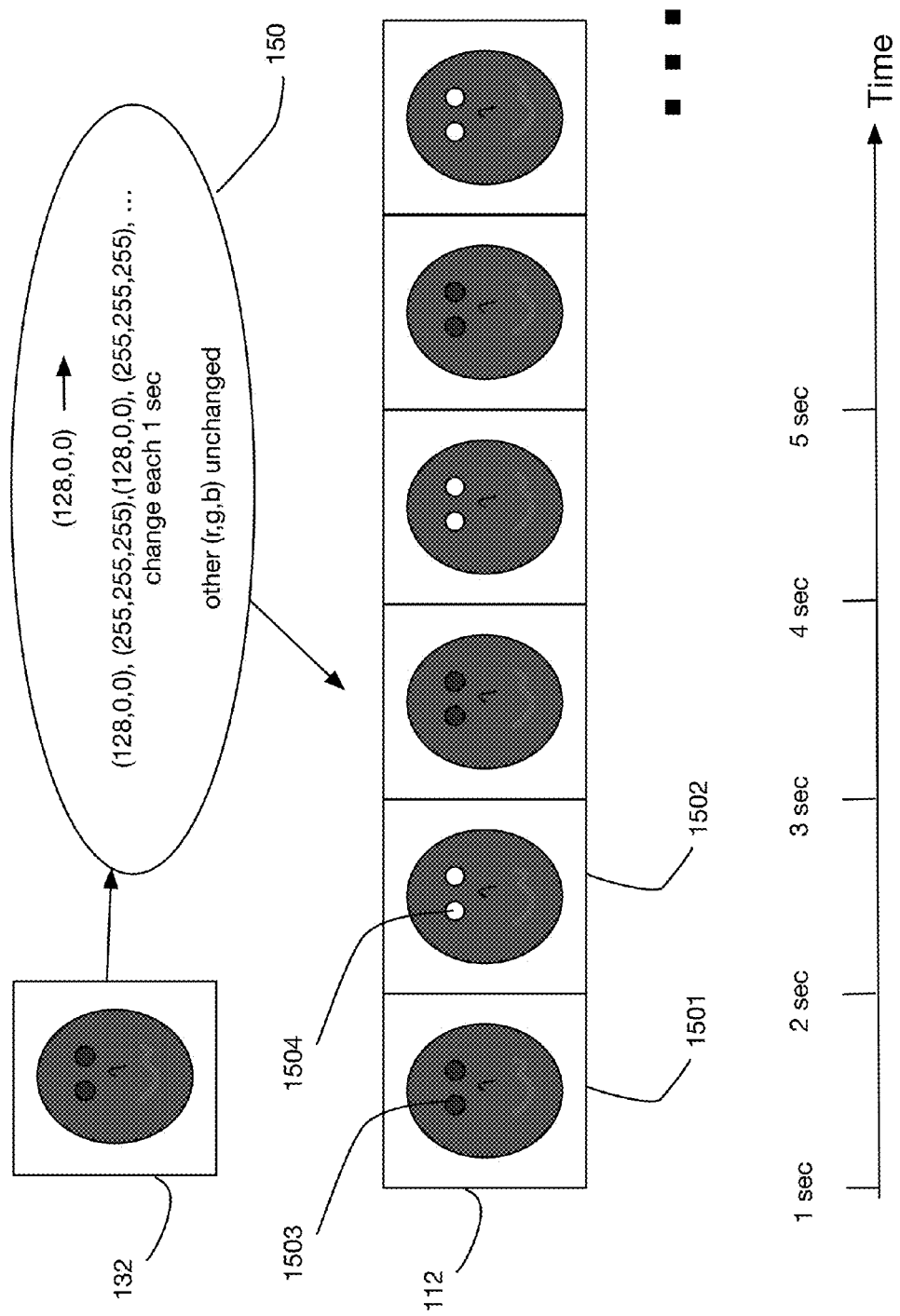
FIG. 15 illustrates an embodiment of an image transformation function that combines elements of the FIG. 8 embodiment for colorblind vision with the FIG. 14 embodiment that provides for flashing pixels.

Some embodiments may use image transformation functions that generate a time sequence of output images to assist vision-impaired users. For example, FIG. 15 illustrates an embodiment that uses a time-varying image output to help colorblind users distinguish between colors that they are normally unable to distinguish. As in the example shown in FIG. 8, the example in FIG. 15 presumes a red-green colorblind user that cannot differentiate between red and green hues. Camera image 132 has eyes with a dark red color with RGB value (128,0,0), and has a face with a dark green color (0,128,0); the red-green colorblind user sees these colors as identical. Image transformation function 150 maps the dark red color to a time sequence of alternating dark red and white colors. In this example the colors alternate every second. Embodiments may use any desired frequency for varying or alternating colors, and may apply color transformations to any subset of colors or to all colors as required for the application. The display image output 112 from function 150 is a sequence of display images that change every second. For example, the first frame 1501 has dark red eyes 1503. The second frame 1502 is shown after one second has elapsed; it has white eyes 1504. The red-green colorblind user can see the difference between the white eyes 1504 and the dark green background of the face, although he or she cannot see the difference between the eyes and the background in frame 1501.

Figure 16:
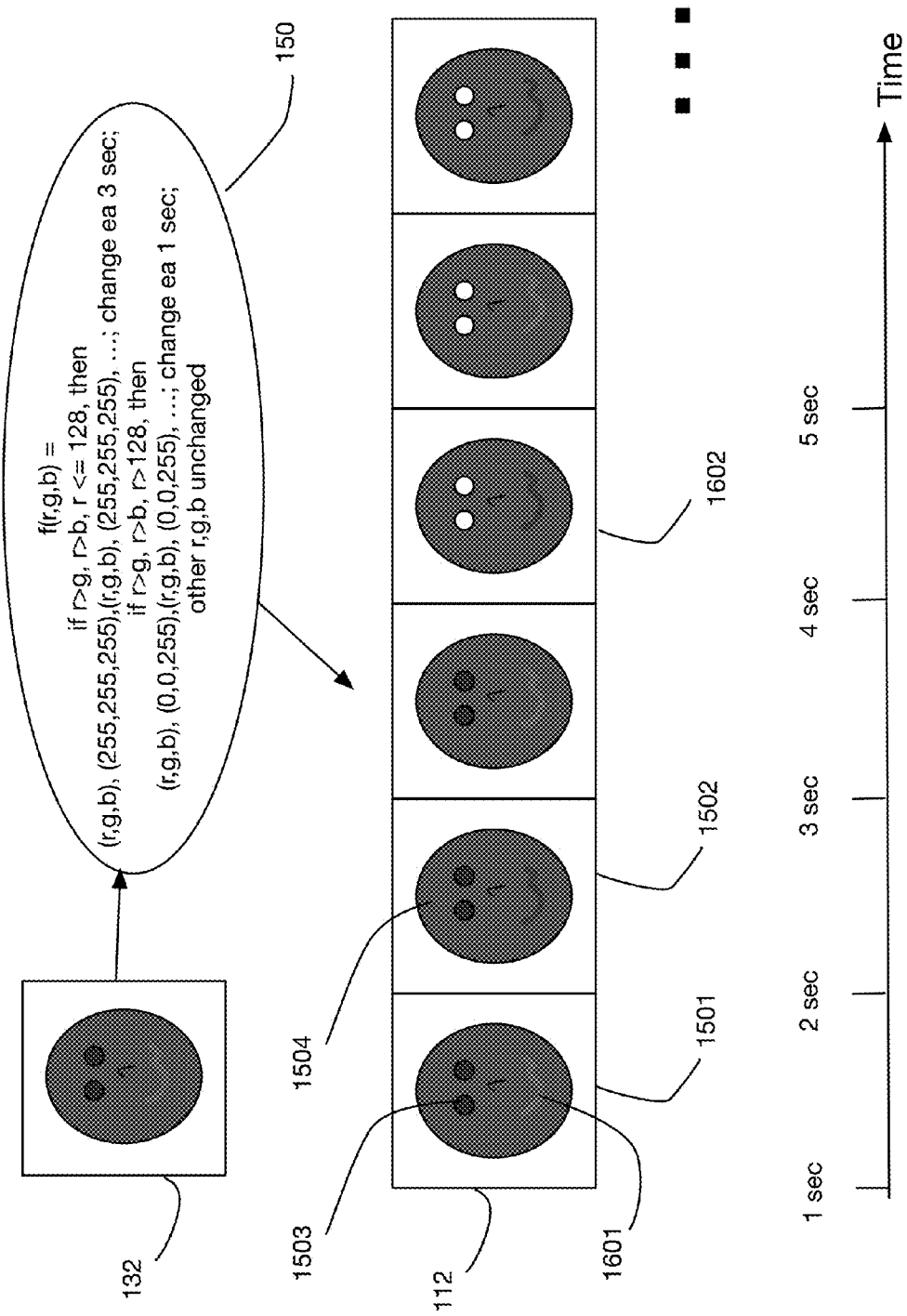
FIG. 16 shows an extension of the embodiment of FIG. 15, where colors in different ranges are mapping into pixels that flash at different frequencies.

One or more embodiments may generate time-varying outputs that vary at different frequencies, where the frequency depends on the input color or on any other characteristics of the camera image. This technique may further assist users in identifying or highlighting specific colors. FIG. 16 illustrates and embodiment that applies a time-varying transform to all pixels with a predominantly red hue. In this embodiment function 150 maps pixels with predominantly dark red color (r<=128) into colors that alternate to white every 3 seconds, and it maps pixels with predominantly bright red color (r>128) into colors that alternate to blue every 1 second. This illustrative embodiment therefore generates different colors and different frequencies of color alternation depending on the color of the input. In display image sequence 112 the dark red eyes 1503 switch to white color after 3 seconds in frame 1602. The bright red mouth 1601 switches more rapidly to a blue color at frame 1502. Users can therefore use both the frequency of flashing and the differences in color to distinguish or highlight different shades of red in this example. Embodiments may employ any desired mixture of frequency variation, color variation, pattern overlay or variation, or combinations thereof to transform images in any desired manner.

Figure 17:
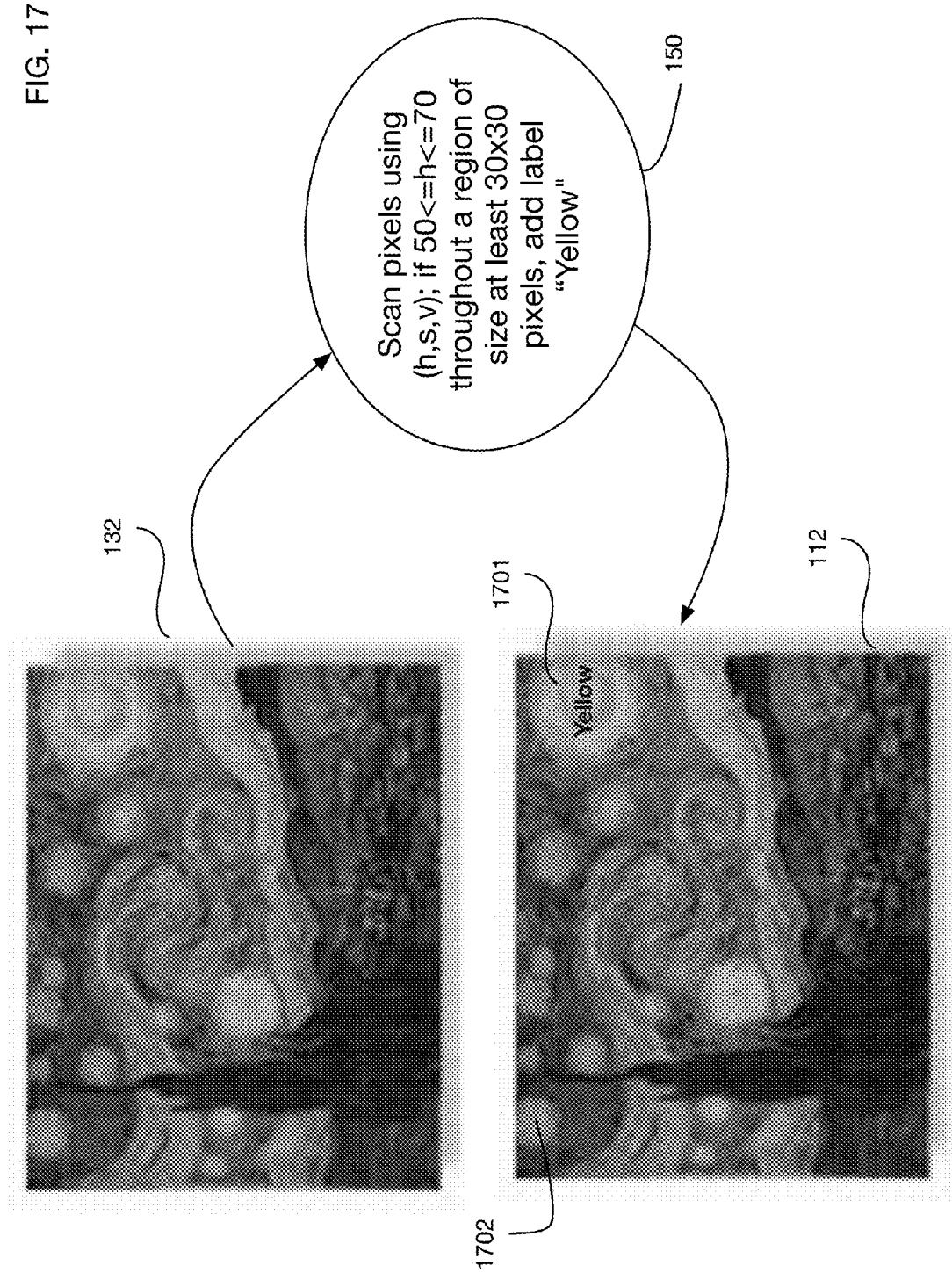
FIG. 17 illustrates an embodiment of an image transformation function that adds a color label to regions in a specified color range.

In one or more embodiments, image transformation functions may add labels, annotations, graphics, or any other decoration to images. For example, labels or outlines or graphics may be added to regions with specific colors. Such labels may include an identifying name of the color or color range, or any other information that assists a user in recognizing or highlighting a color. Some embodiments may add labels or graphics to pixels or pixel regions with any other features of interest, such as particular shapes, textures, sizes, orientations, outlines, hues, brightness, consistency, or any other recognizable characteristic. Addition of labels or graphics may be done in addition to any other transformations such as for example modification of colors or generation of time-varying display images. FIG. 17 illustrates an embodiment with image transformation function 150 that adds a color label to regions with a predominantly yellow hue. In this example, function 150 uses an HSV color representation for pixels of camera image 132. It scans the image 132 for contiguous regions where all pixels in the region have a hue value between 50 and 70 (where pure yellow has a hue of 60). In this embodiment the image transformation function scans for regions of at least 30 pixels by 30 pixels, and labels them with "Yellow." Camera image 132 has only one such region, which is labeled at 1701 in display image 112. Region 1702 has the correct hue, but it is too small and therefore is not labeled. Embodiments may use any combination of features to select labels or graphics. In some embodiments color labels or graphics may be added to assist colorblind users in identifying colors that they are otherwise unable to distinguish. Other embodiments may use labels or graphics to highlight regions or pixels for any desired application, such as highlighting regions with specified colors for inspection applications for example.

Figure 18:
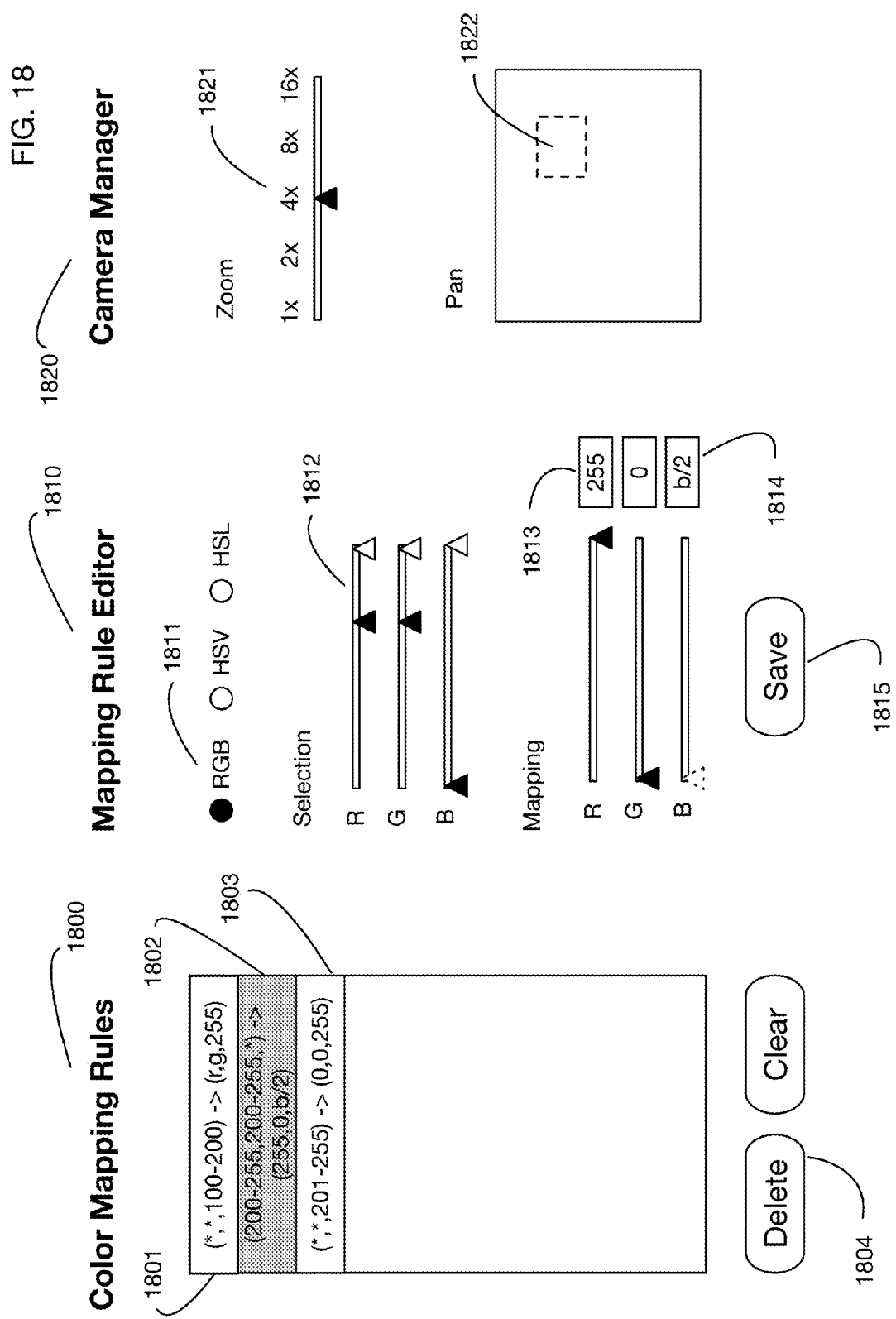
FIG. 18 illustrates an embodiment of an image transforming vision enhancement device that provides a user interface to customize and configure the image transformations.

One or more embodiments of the invention may incorporate one or more user interfaces that users can employ to configure or customize the vision enhancement device. User interfaces may consist of screens, buttons, levers, knobs, switches, voice inputs, gesture recognition, mice or trackballs, touchpads or touchscreens, or any other device or devices that accept input from a user. User interfaces may be standalone devices or hardware, or they may be embedded in any other device including for example, without limitation, desktop computers, laptop computers, notebook computers, tablet computers, gaming systems, smart phones, smart watches, or personal digital assistants. User interface devices may be integrated into the device or devices containing the system's displays, cameras, or processors, or they may be separate devices that communicate with the system. Any device that can communicate or exchange information with the system's components may be used as a user interface device. Some embodiments may provide multiple user interfaces, each of which can be used to configure or customize all or part of the operation of the vision enhancement device. FIG. 18 illustrates an example of a user interface for an embodiment that provides a computer-based user input screen. This example user interface provides options to create and edit color transformation rules, and to manage pan and zoom features for selecting and magnifying images. These options are illustrative examples; embodiments may provide any desired user interface to modify any aspect of the operation of the vision enhancement device. In FIG. 18, existing Color Mapping Rules 1800 are presented in a list. These rules are used to generate image transformation function 150 shown in FIG. 1. In this example there are three rules currently defined at 1801, 1802 and 1803. Each rule specifies color criteria for selection of pixels, and transformation to the color of the selected pixels. The user can select a rule and edit it using the features in Mapping Rule Editor 1810. The user can also delete an existing rule using button 1804, or clear all existing rules. In the example shown the user has selected rule 1802 and the details for this rule are presented in 1810. The user selects or modifies a color space for the rule; in this example the rule uses color space RGB at 1811. The rule editor provides color sliders 1812 to select the ranges of colors to which the rule applies. The color mapping is specified with a combination of color sliders and direct input in text boxes. In this example the selected pixels have red maximized to 255 in input box 1813, and the blue value is reduced by half in input box 1814. Input box 1814 contains an expression "b/2" rather than a specific numerical value, to indicate that the output color depends on the value of the input color. Embodiments may use any desired expression language or graphical language to define color mappings or other transformations. In addition to sliders and input boxes, such inputs may include, without limitation, graphs, tables, charts, standard programming languages, specialized domain-specific programming languages or expression languages, databases, XML definitions, dataflow diagrams, or any other technique for specifying rules for transformations. In the example of FIG. 18 the user can modify the selected rule as desired and save the changes using button 1815. Although shown with three color space settings, any number of color spaces may be implemented, for example that include frequency ranges typically not visible to the naked eye.

The embodiment illustrated in FIG. 18 also includes a user interface element 1812 for a Camera Manager. This interface provides zoom and pan capabilities. These capabilities may be implement in the cameras themselves, in the image transformation function, or using a combination of camera features and image transformation function features. In this example the user can select a zoom level using slider 1821. For a magnified view, the user can also select the field of view using the Pan screen; in this example the user can drag the view box 1822 to select different areas to display and magnify. Some embodiments may provide physical controls for zoom or pan controls, such as joysticks, buttons, knobs, or other input devices. Embodiments may also provide user inputs for other image transformation capabilities, such as for example rotating images or sharpening images.

Figure 19:
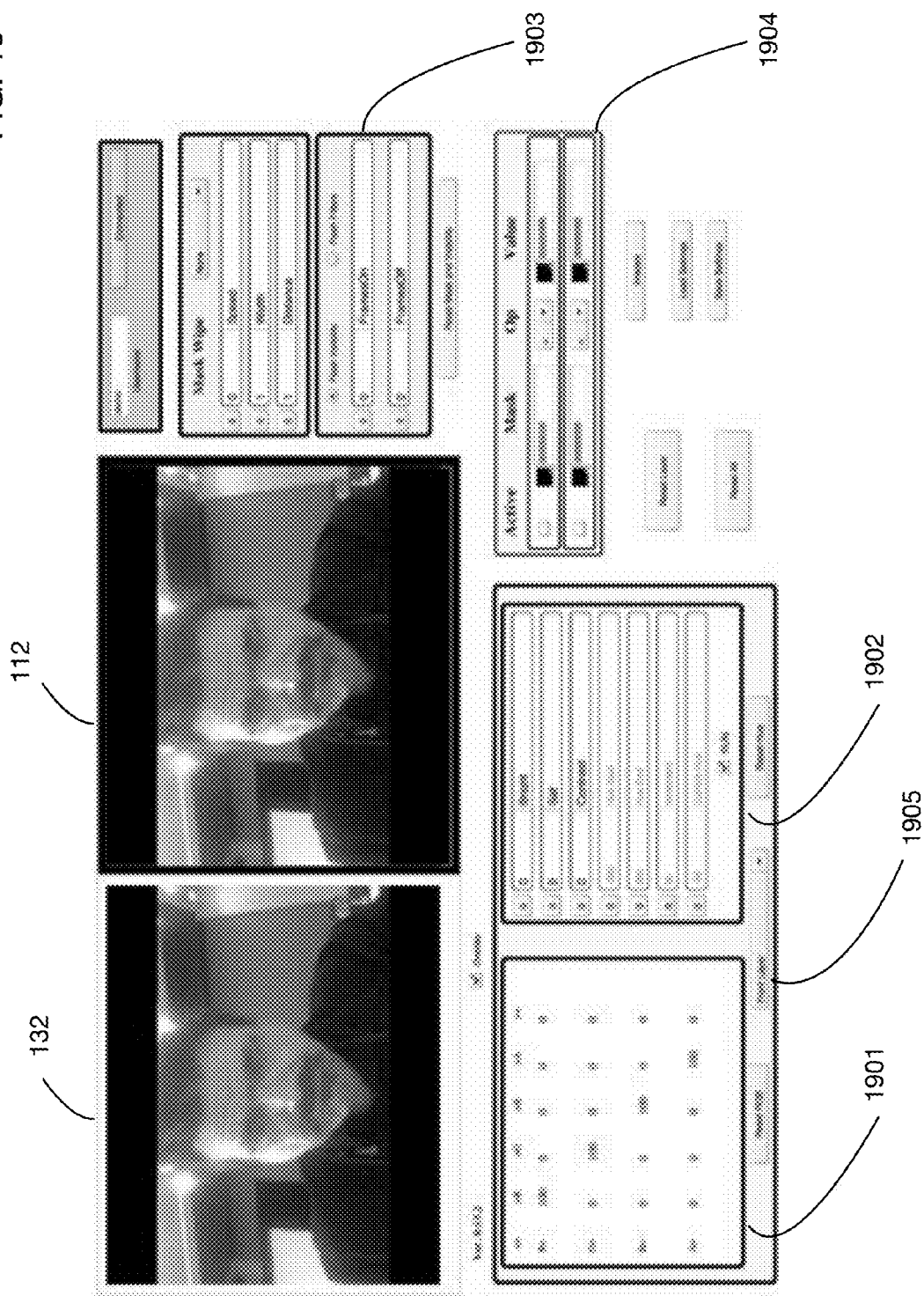
FIG. 19 illustrates another embodiment with a user interface to customize and configure the image transformations.

FIG. 19 illustrates another example of a user interface for an embodiment that provides a computer-based user input screen. This embodiment illustrates a different organization for the controls of the image transformation function. Embodiments may use any desired organization for user interface controls. The user interface shown in FIG. 19 includes a live display of camera image 132 and display image 112. These image displays provide immediate feedback to the user on the effects of modifications to the image transformation function. Color transformations are configured in RGBA transform matrix 1901 and in HSV controls 1902. In this embodiment image transformations may be specified using either color space RGBA or color space HSV. Embodiments may use any color space or any combination of color spaces to define and configure image transformation functions. Pull-down menu 1905 selects the layer to which the image transformation definitions apply. In this embodiment different image transformations may be created in multiple layers and the layers can then be intermixed or merged via blending, overlaying (using alpha channels for transparency), masking, or wiping or flashing to alternate layers over time. The user interface shown in FIG. 19 also includes timing control 1903 to control flashing of frames, and mask control 1904 to define and edit image masks that select pixels for which the other transformations apply.

While the invention herein disclosed has been described by means of specific embodiments and applications thereof, numerous modifications and variations could be made thereto by those skilled in the art without departing from the scope of the invention set forth in the claims.

What is claimed is:

1. An image transforming vision enhancement device comprising:
    one or more displays that present display images to one or both eyes of a user, wherein each of said display images comprises a plurality of pixels with values in a display color space;
    one or more cameras configured to capture camera images, wherein each of said camera images comprises a plurality of pixels with values in a camera color space;
    a processor coupled to said one or more displays and to said one or more cameras, wherein said processor
        receives said camera images from said one or more cameras;
        transforms said camera images into said display images via an image transformation function;
        sends said display images to said one or more displays to be viewed by said user;
    wherein said image transformation function maps values from said camera color space into values of said display color space;
    wherein said camera color space includes one or more light frequencies outside of the human visible range of light; and,
    wherein said display color space represents frequencies or frequency mixtures within the human visible range of light;
    wherein said image transformation function partitions said display color space into a visible frequency representation subspace and an invisible frequency representation subspace;
    wherein said image transformation function maps values from said camera color space with one or more frequencies outside of the human visible range of light into said invisible frequency representation subspace; and,
    wherein said image transformation function maps values from said camera color space that represent frequencies or frequency mixtures within the human visible range of light into said visible frequency representation subspace.

2. The image transforming vision enhancement device of claim 1, wherein
    said one or more displays are configured to be placed or worn proximal to said one or both eyes of said user;
    said one or more cameras are proximal to said one or more displays; and
    the field of view of said one or more cameras has a non-empty intersection with the normal field of view of said user.

3. The image transforming vision enhancement device of claim 1, wherein said one or more displays, or said one or more cameras, or both of said one or more displays and said one or more cameras, are located within eyeglasses or contact lenses or intraocular lenses.

4. The image transforming vision enhancement device of claim 1, wherein said one or more displays, or said one or more cameras, or both of said one or more displays and said one or more cameras, are located within a television or a game system or a desktop computer or a laptop computer or a tablet computer or a mobile phone or a personal digital assistant or a diving helmet or a welding helmet or a medical device or a scientific device.

5. The image transforming vision enhancement device of claim 1, wherein
    said one or more displays are coupled to a network; and,
    said camera images, or said display images, or both of said camera images and said display images are transmitted over said network to said one or more displays.

6. The image transforming vision enhancement device of claim 5, wherein said network is the Internet.

7. The image transforming vision enhancement device of claim 1, wherein said one or more cameras, said image transformation function, or both, provide a zoom capability to increase or reduce magnification of said display images relative to said user's normal vision.

8. The image transforming vision enhancement device of claim 7, wherein said one or more displays, or said one or more cameras, or both of said one or more displays and said one or more cameras, are located within binoculars or a monocular or a telescope or a microscope.

9. The image transforming vision enhancement device of claim 1, further comprising a plurality of said cameras, wherein said image transformation function combines said camera images from two or more of said cameras onto a single display image.

10. The image transforming vision enhancement device of claim 9, wherein said image transforming function combines said camera images from two or more of said cameras into a picture-in-picture display image.

11. The image transforming vision enhancement device of claim 9, wherein
    the field of view of at least one of said cameras has a non-empty intersection with the normal field of view of said user; and
    the field of view of at least one other of said cameras has an empty intersection with the normal field of view of said user.

12. The image transforming vision enhancement device of claim 1, further comprising a plurality of said displays, wherein
    said image transformation function comprises a plurality of display-specific image transformation functions;
    each of said display-specific image transformation functions generates said display images for its corresponding display.

13. The image transforming vision enhancement device of claim 12, wherein two or more of said display-specific image transformation functions map at least one value from said camera color space into different values in said display color space.

14. The image transforming vision enhancement device of claim 1, wherein said image transformation function maps two or more values in said camera color space that are difficult or impossible for a vision-impaired user to distinguish into values in said display color space that said vision-impaired user can distinguish.

15. The image transforming vision enhancement device of claim 1, wherein said image transformation function comprises:

an image mask that selects pixels in said one or more camera images having said color values in one or more color ranges of interest; and a selected pixel modification function that modifies said pixels in said one or more camera images that are selected by said image mask.

16. The image transforming vision enhancement device of claim 1, wherein said image transformation function alters the brightness of one or more of said pixels in said camera images to improve visibility of dark scenes, or to reduce the brightness of excessively bright regions, or both.

17. The image transforming vision enhancement device of claim 16, wherein said one or more displays, or said one or more cameras, or both of said one or more displays and said one or more cameras, are coupled to a moving vehicle.

18. The image transforming vision enhancement device of claim 1, wherein said image transformation function maps distinct values in said camera color space that represent frequencies or frequency mixtures within the human visible range of light into distinct values in said visible frequency representation subspace.

19. The image transforming vision enhancement device of claim 18, wherein
said camera color space comprises a camera hue value for each of said pixels of said camera images;
said display color space comprises a display hue value for each of said pixels of said display images, wherein said display hue values are within a display hue range;
said image transformation function
partitions said display hue range into a compressed visible hue range and an invisible hue representation range;
maps distinct camera hue values in said camera color space into distinct display hue values in said display hue range;
maps camera hue values in said camera color space that represent frequencies or frequency mixtures within the human visible range of light into display hue values in said compressed visible hue range; and,
maps camera hue values in said camera color space that contain frequencies outside the human visible range of light into display hue values in said invisible hue representation range.

20. The image transforming vision enhancement device of claim 1, wherein
said display color space comprises a time series of color values for each of said pixels of each of said display images;
said processor
receives said camera images from said one or more cameras;
transforms each of said camera images into a time series of said display images via said image transformation function;
sends said time series of said display images to said one or more displays to be displayed in sequence and viewed by said user; and
wherein said image transformation function maps values from said camera color space into said time series of color values of said display color space.

21. The image transforming vision enhancement device of claim 20, wherein said image transformation function maps two or more values in said camera color space that are difficult or impossible for a vision-impaired user to distinguish into different time series values in said display color space that said vision-impaired user can distinguish.

22. The image transforming vision enhancement device of claim 21, wherein said different times series values comprise repeating time series values with a period or different periods.

23. The image transforming vision enhancement device of claim 1, wherein said image transformation function further adds labels or graphics or patterns onto said display images that identify one or more colors.

24. The image transforming vision enhancement device of claim 1, further comprising a user interface that accepts input from an operator, wherein said input is used to select or modify said image transformation function.

25. The image transforming vision enhancement device of claim 7, further comprising a user interface that accepts input from an operator, wherein said input is used to select or modify the magnification, or the field of view, or both the magnification and the field of view, of said one or more cameras or of said image transformation function.

26. The image transforming vision enhancement device of claim 1, further comprising a microphone coupled with said processor wherein said processor generates display information related to sound obtained from said microphone and sends said display information related to sound to said one or more displays to be viewed by said user.

27. An image transforming vision enhancement device comprising:
one or more displays that present display images to one or both eyes of a user, wherein each of said display images comprises a plurality of pixels with values in a display color space;
one or more cameras configured to capture camera images, wherein each of said camera images comprises a plurality of pixels with values in a camera color space;
a processor coupled to said one or more displays and to said one or more cameras, wherein said processor
receives said camera images from said one or more cameras;
transforms said camera images into said display images via an image transformation function;
sends said display images to said one or more displays to be viewed by said user;
wherein said image transformation function maps values from said camera color space into values of said display color space;
wherein said display color space comprises a time series of color values for each of said pixels of each of said display images;
wherein said processor
receives said camera images from said one or more cameras;
transforms each of said camera images into a time series of said display images via said image transformation function;
sends said time series of said display images to said one or more displays to be displayed in sequence and viewed by said user;
wherein said image transformation function maps values from said camera color space into said time series of color values of said display color space;
wherein said image transformation function maps two or more values in said camera color space that are difficult or impossible for a vision-impaired user to distinguish into different time series values in said display color space that said vision-impaired user can distinguish; and, wherein said different times series values comprise repeating time series values with a period or different periods.

28. The image transforming vision enhancement device of claim 27, wherein
said one or more displays are configured to be placed or worn proximal to said one or both eyes of said user;
said one or more cameras are proximal to said one or more displays; and
the field of view of said one or more cameras has a non-empty intersection with the normal field of view of said user.

29. The image transforming vision enhancement device of claim 27, wherein said one or more displays, or said one or more cameras, or both of said one or more displays and said one or more cameras, are located within eyeglasses or contact lenses or intraocular lenses.

30. The image transforming vision enhancement device of claim 27, wherein said one or more displays, or said one or more cameras, or both of said one or more displays and said one or more cameras, are located within a television or a game system or a desktop computer or a laptop computer or a tablet computer or a mobile phone or a personal digital assistant or a diving helmet or a welding helmet or a medical device or a scientific device.

31. The image transforming vision enhancement device of claim 27, wherein
said one or more displays are coupled to a network;
said camera images, or said display images, or both of said camera images and said display images are transmitted over said network to said one or more displays.

32. The image transforming vision enhancement device of claim 31, wherein said network is the Internet.

33. The image transforming vision enhancement device of claim 27, wherein said one or more cameras, said image transformation function, or both, provide a zoom capability to increase or reduce magnification of said display images relative to said user's normal vision.

34. The image transforming vision enhancement device of claim 33, wherein said one or more displays, or said one or more cameras, or both of said one or more displays and said one or more cameras, are located within binoculars or a monocular or a telescope or a microscope.

35. The image transforming vision enhancement device of claim 27, further comprising a plurality of said cameras, wherein said image transformation function combines said camera images from two or more of said cameras onto a single display image.

36. The image transforming vision enhancement device of claim 35, wherein said image transforming function combines said camera images from two or more of said cameras into a picture-in-picture display image.

37. The image transforming vision enhancement device of claim 35, wherein the field of view of at least one of said cameras has a non-empty intersection with the normal field of view of said user; and
the field of view of at least one other of said cameras has an empty intersection with the normal field of view of said user.

38. The image transforming vision enhancement device of claim 27, further comprising a plurality of said displays, wherein
said image transformation function comprises a plurality of display-specific image transformation functions;
each of said display-specific image transformation functions generates said display images for its corresponding display.

39. The image transforming vision enhancement device of claim 38, wherein two or more of said display-specific image transformation functions map at least one value from said camera color space into different values in said display color space.

40. The image transforming vision enhancement device of claim 27, wherein said image transformation function maps two or more values in said camera color space that are difficult or impossible for a vision-impaired user to distinguish into values in said display color space that said vision-impaired user can distinguish.

41. The image transforming vision enhancement device of claim 27, wherein said image transformation function comprises:
an image mask that selects pixels in said one or more camera images having said color values in one or more color ranges of interest; and
a selected pixel modification function that modifies said pixels in said one or more camera images that are selected by said image mask.

42. The image transforming vision enhancement device of claim 27, wherein said image transformation function alters the brightness of one or more of said pixels in said camera images to improve visibility of dark scenes, or to reduce the brightness of excessively bright regions, or both.

43. The image transforming vision enhancement device of claim 42, wherein said one or more displays, or said one or more cameras, or both of said one or more displays and said one or more cameras, are coupled to a moving vehicle.

44. The image transforming vision enhancement device of claim 27, wherein said image transformation function further adds labels or graphics or patterns onto said display images that identify one or more colors.

45. The image transforming vision enhancement device of claim 27, further comprising a user interface that accepts input from an operator, wherein said input is used to select or modify said image transformation function.

46. The image transforming vision enhancement device of claim 33, further comprising a user interface that accepts input from an operator, wherein said input is used to select or modify the magnification, or the field of view, or both the magnification and the field of view, of said one or more cameras or of said image transformation function.

47. The image transforming vision enhancement device of claim 27, further comprising a microphone coupled with said processor wherein said processor generates display information related to sound obtained from said microphone and sends said display information related to sound to said one or more displays to be viewed by said user.

48. An image transforming vision enhancement device comprising:
one or more displays that present display images to one or both eyes of a user, wherein each of said display images comprises a plurality of pixels with values in a display color space;
one or more cameras configured to capture camera images, wherein each of said camera images comprises a plurality of pixels with values in a camera color space;
a processor coupled to said one or more displays and to said one or more cameras, wherein said processor
receives said camera images from said one or more cameras;
transforms said camera images into said display images via an image transformation function;
sends said display images to said one or more displays to be viewed by said user;

wherein said image transformation function maps values from said camera color space into values of said display color space;

wherein said camera color space includes one or more light frequencies outside of the human visible range of light; and, wherein said display color space represents frequencies or frequency mixtures within the human visible range of light;

said image transformation function partitions said display color space into a visible frequency representation subspace and an invisible frequency representation subspace;

said image transformation function maps values from said camera color space with one or more frequencies outside of the human visible range of light into said invisible frequency representation subspace;

said image transformation function maps values from said camera color space that represent frequencies or frequency mixtures within the human visible range of light into said visible frequency representation subspace;

wherein said display color space comprises a time series of color values for each of said pixels of each of said display images;

wherein said processor receives said camera images from said one or more cameras;
  transforms each of said camera images into a time series of said display images via said image transformation function;
  sends said time series of said display images to said one or more displays to be displayed in sequence and viewed by said user;

wherein said image transformation function maps values from said camera color space into said time series of color values of said display color space;

wherein said image transformation function maps two or more values in said camera color space that are difficult or impossible for a vision-impaired user to distinguish into different time series values in said display color space that said vision-impaired user can distinguish; and, wherein said different times series values comprise repeating time series values with a period or different periods.

* * * * *